Feb. 28, 1950 J. E. BALASQUIDE 2,499,209
MACHINE FOR MOLDING ARTICLES
Filed Oct. 20, 1945 15 Sheets-Sheet 1

INVENTOR.
JOSE E. BALASQUIDE.
BY
Bard, Crosby & Heal
ATTORNEYS.

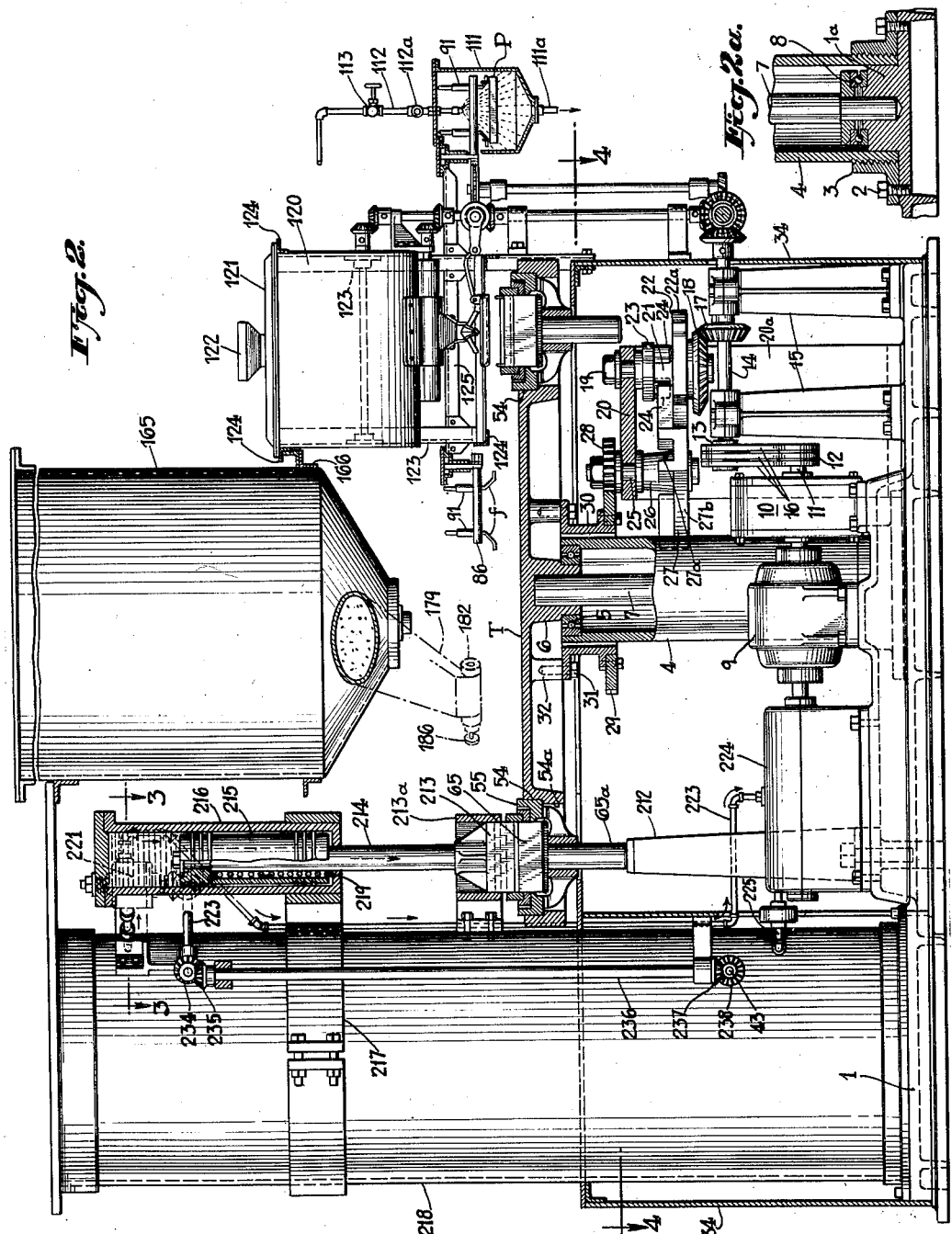

Feb. 28, 1950     J. E. BALASQUIDE     2,499,209
MACHINE FOR MOLDING ARTICLES
Filed Oct. 20, 1945     15 Sheets-Sheet 3
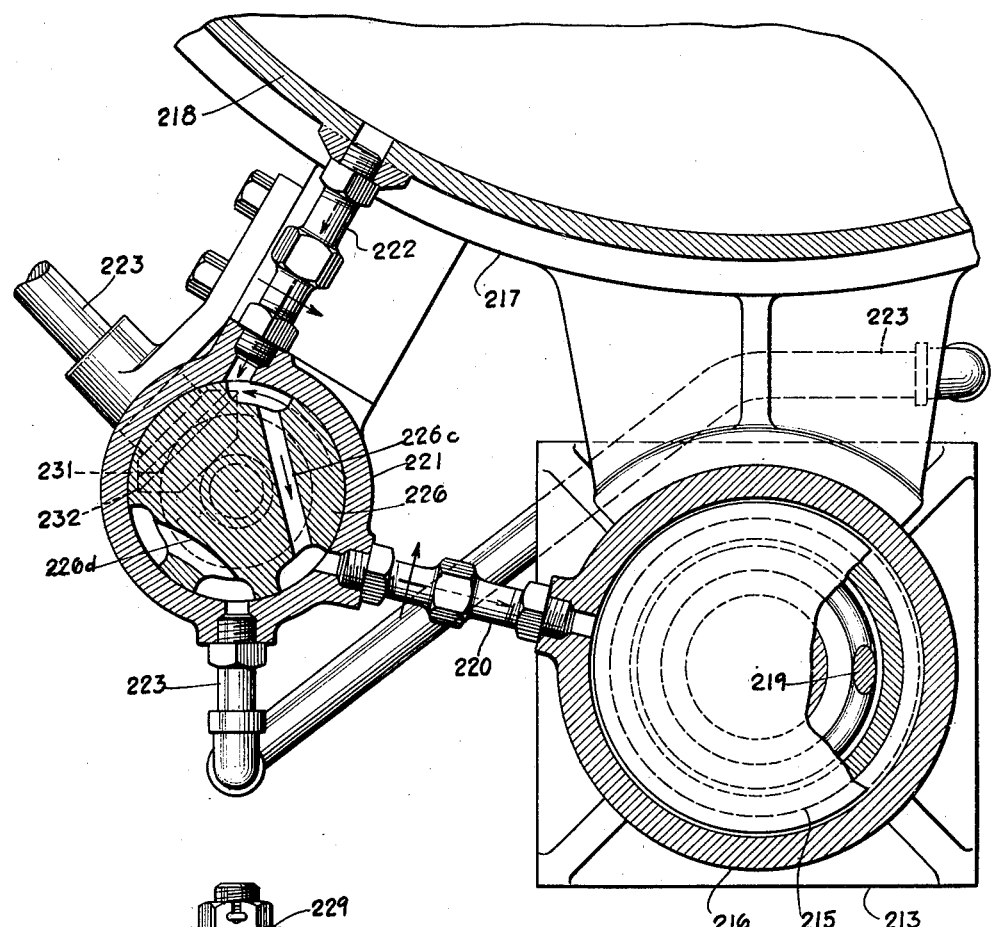
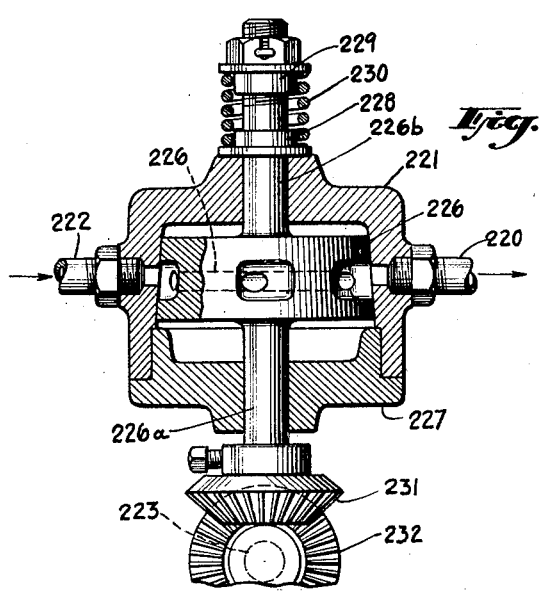
INVENTOR.
JOSE E. BALASQUIDE.
BY
Ward, Crosby & Neal
ATTORNEYS.

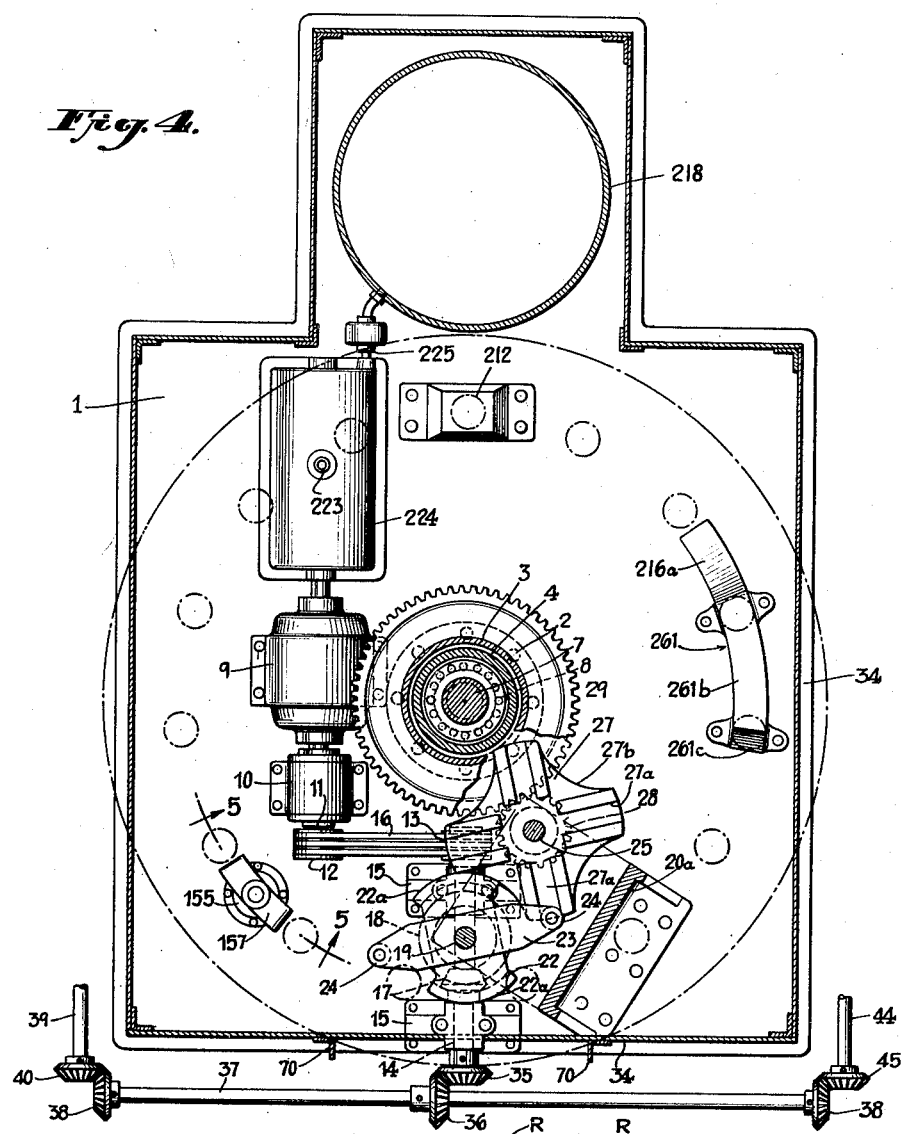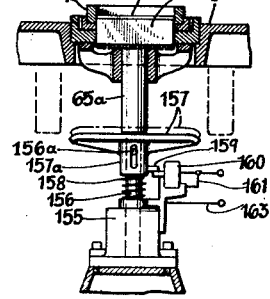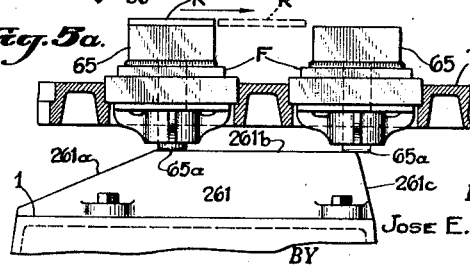

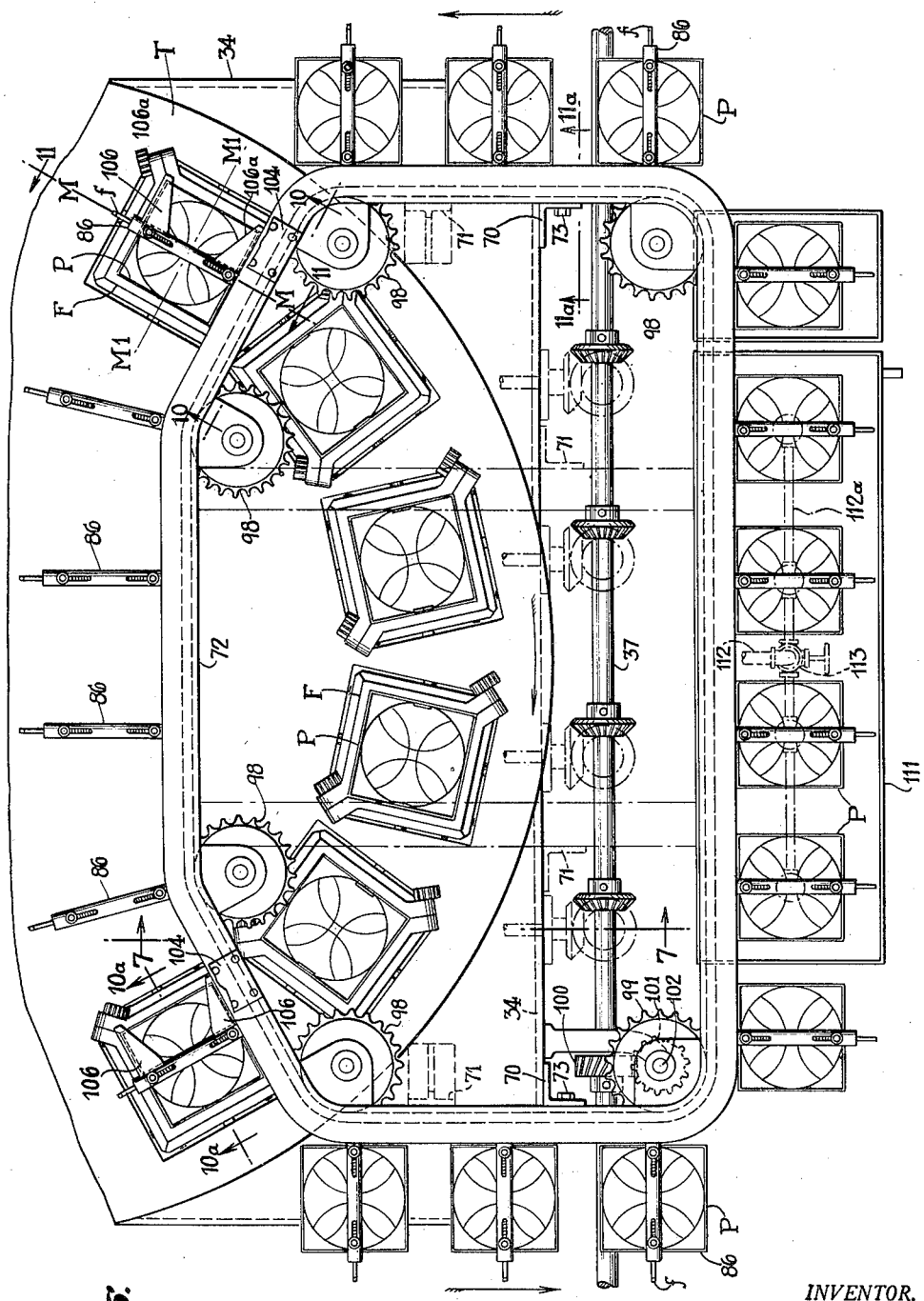

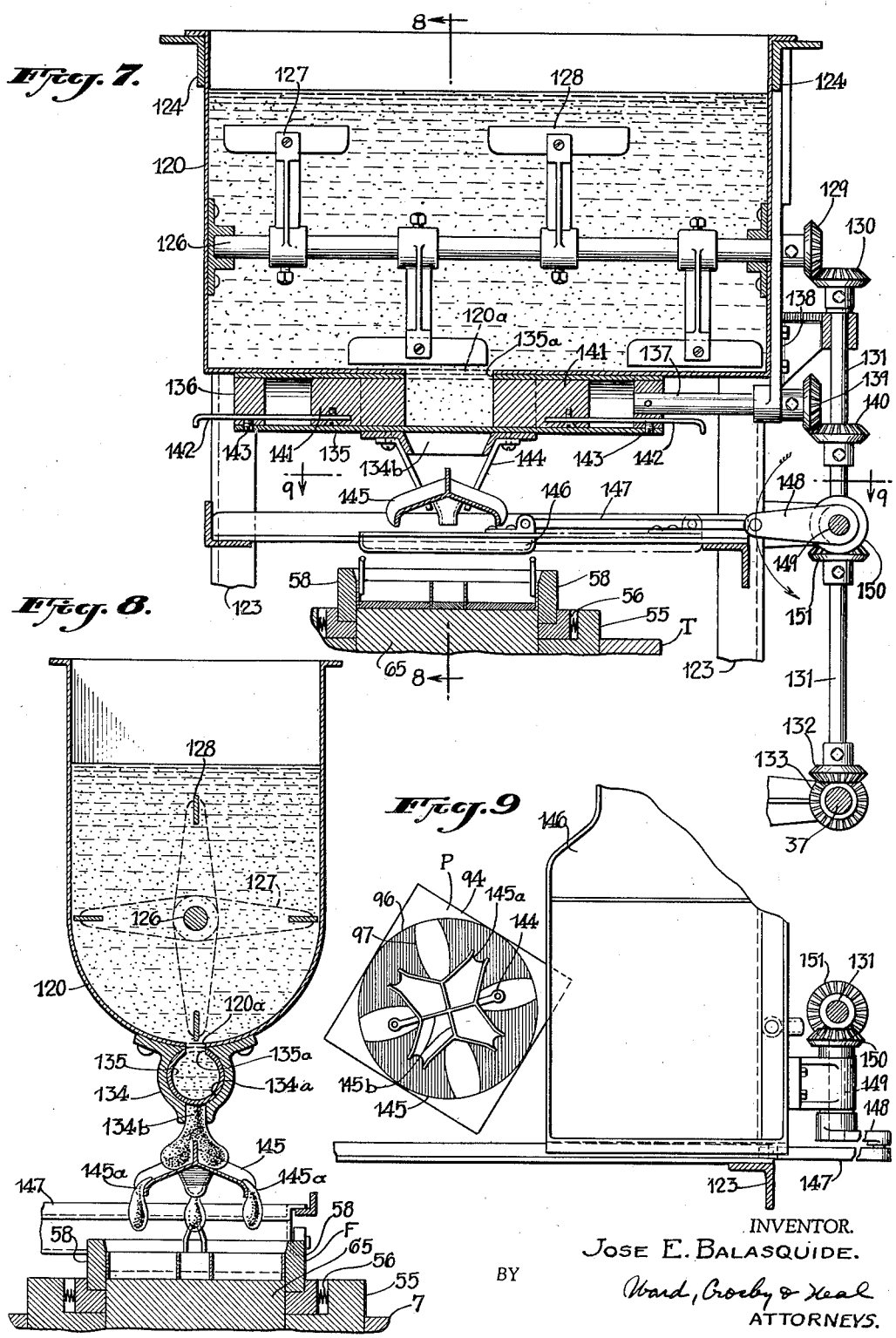

Feb. 28, 1950 — J. E. BALASQUIDE — 2,499,209
MACHINE FOR MOLDING ARTICLES
Filed Oct. 20, 1945 — 15 Sheets-Sheet 7
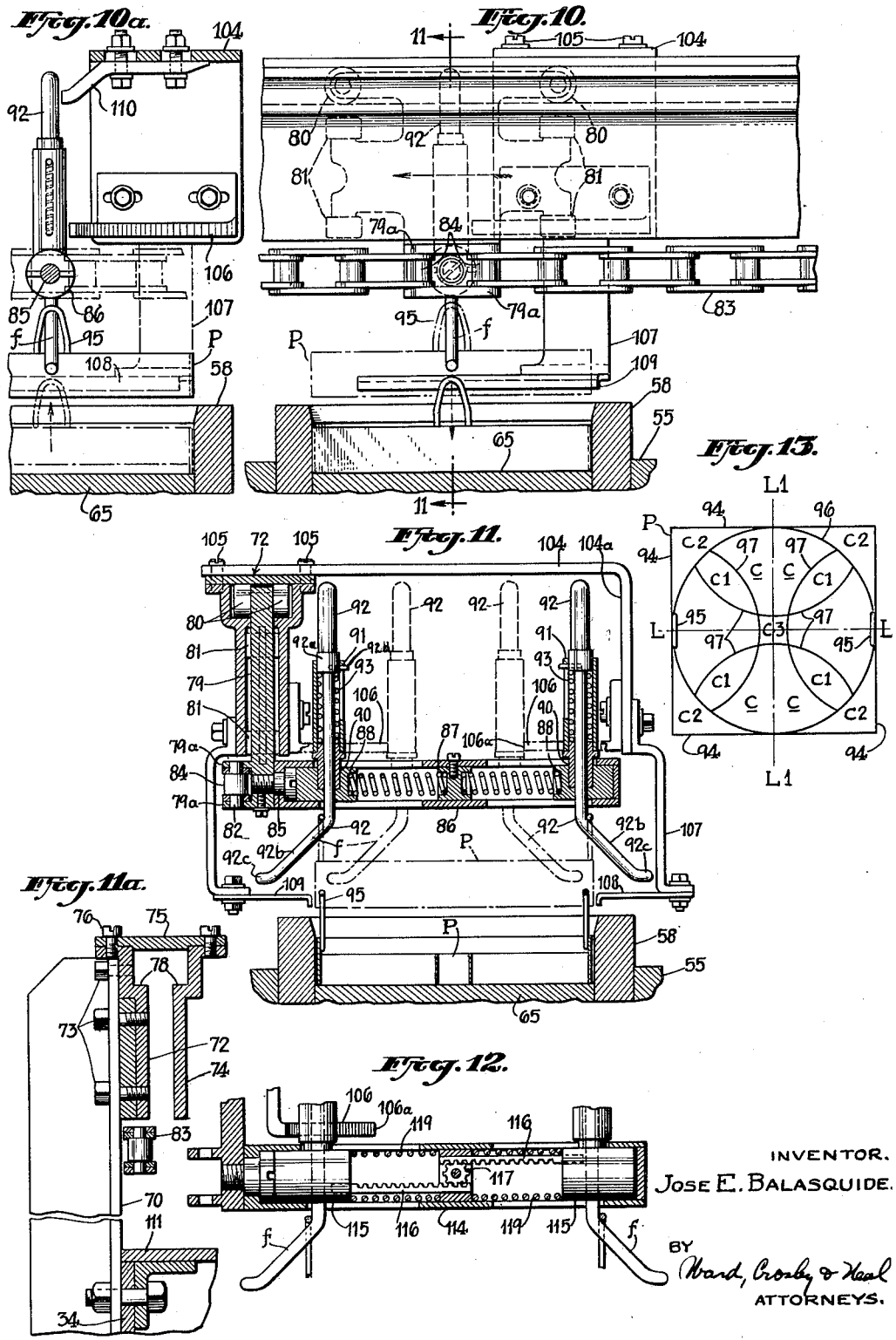
INVENTOR.
JOSE E. BALASQUIDE.
BY Ward, Crosby & Heal
ATTORNEYS.

Feb. 28, 1950 J. E. BALASQUIDE 2,499,209
MACHINE FOR MOLDING ARTICLES
Filed Oct. 20, 1945 15 Sheets-Sheet 8
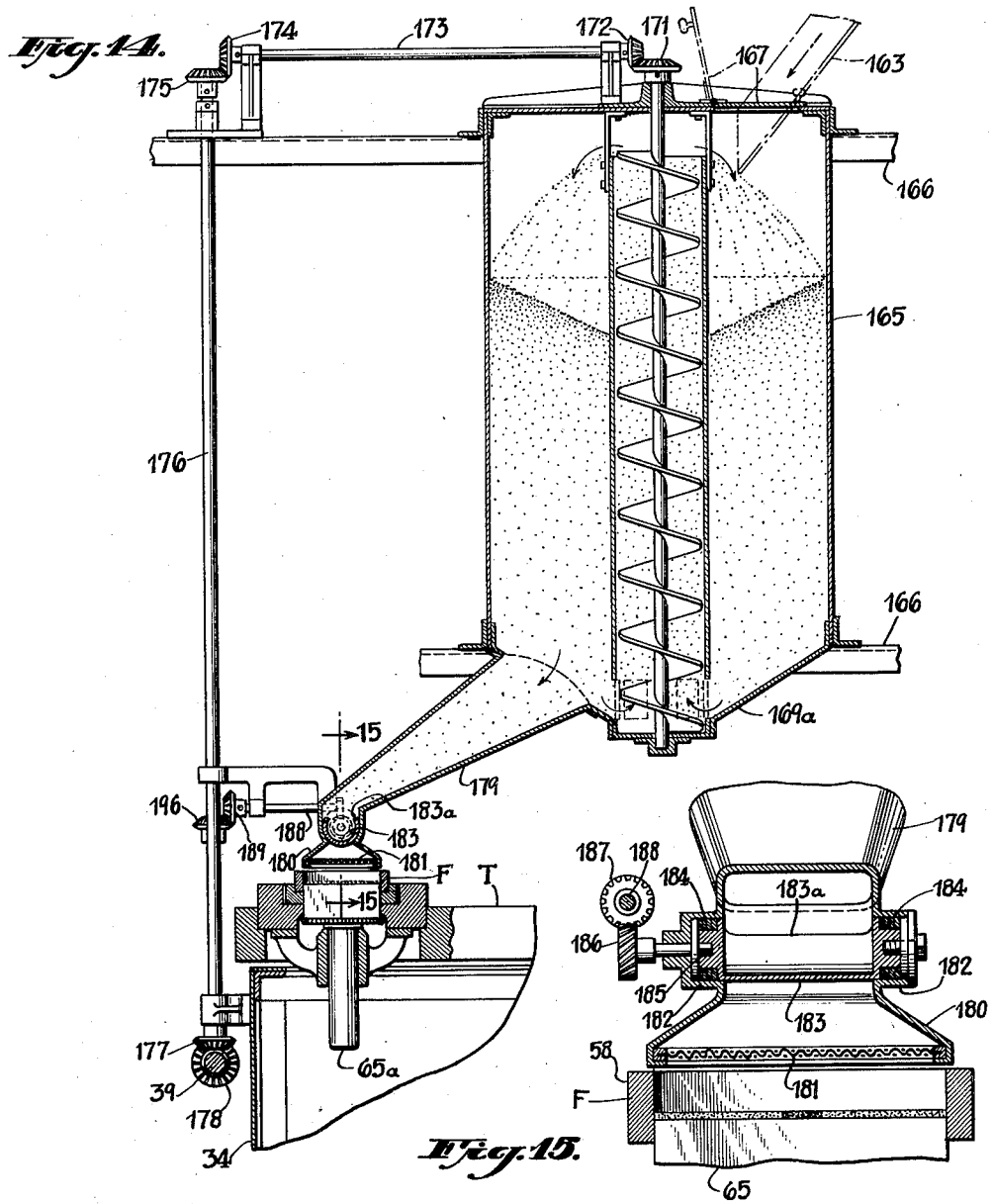
INVENTOR.
JOSE E. BALASQUIDE.
BY
Ward, Crosby & Neal
ATTORNEYS.

Feb. 28, 1950 J. E. BALASQUIDE 2,499,209
MACHINE FOR MOLDING ARTICLES
Filed Oct. 20, 1945 15 Sheets-Sheet 9
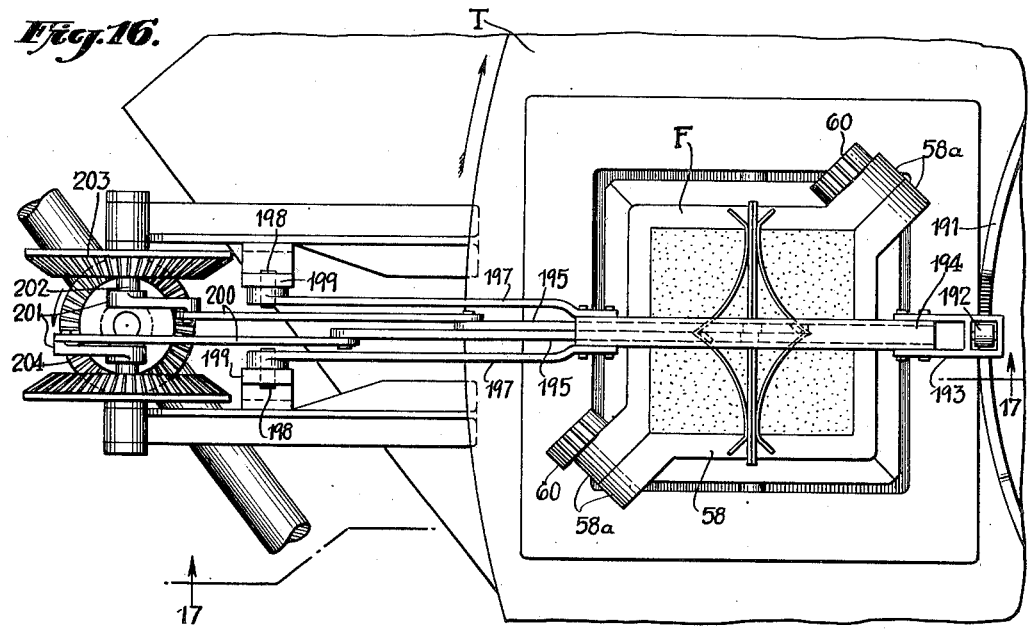
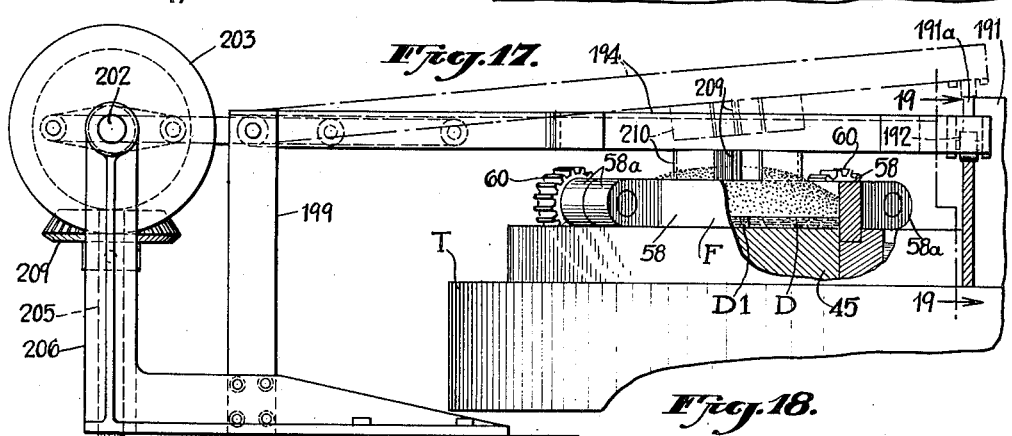
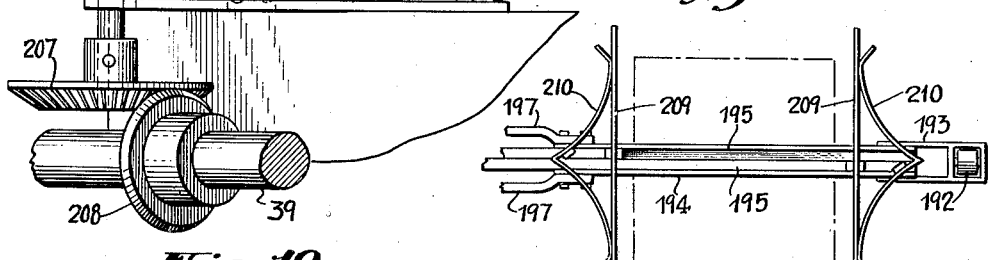
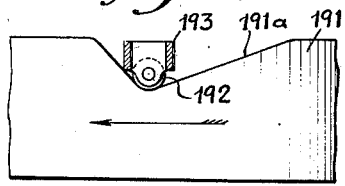
INVENTOR.
JOSE E. BALASQUIDE.
BY Ward, Crosby & Neal
ATTORNEYS.

Feb. 28, 1950     J. E. BALASQUIDE     2,499,209
MACHINE FOR MOLDING ARTICLES
Filed Oct. 20, 1945     15 Sheets-Sheet 10
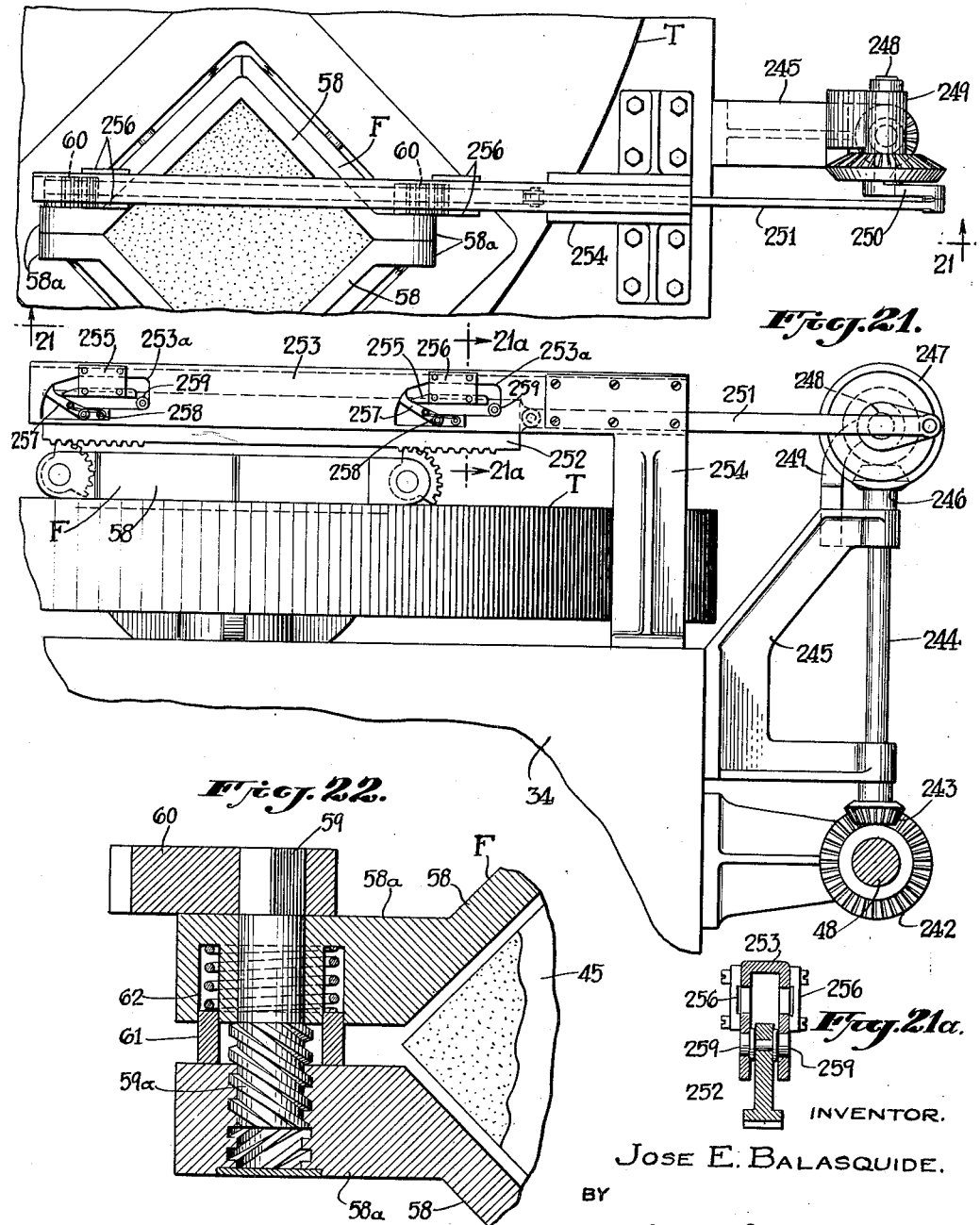
INVENTOR.
JOSE E. BALASQUIDE.
BY
Ward, Crosby & Neal
ATTORNEYS.

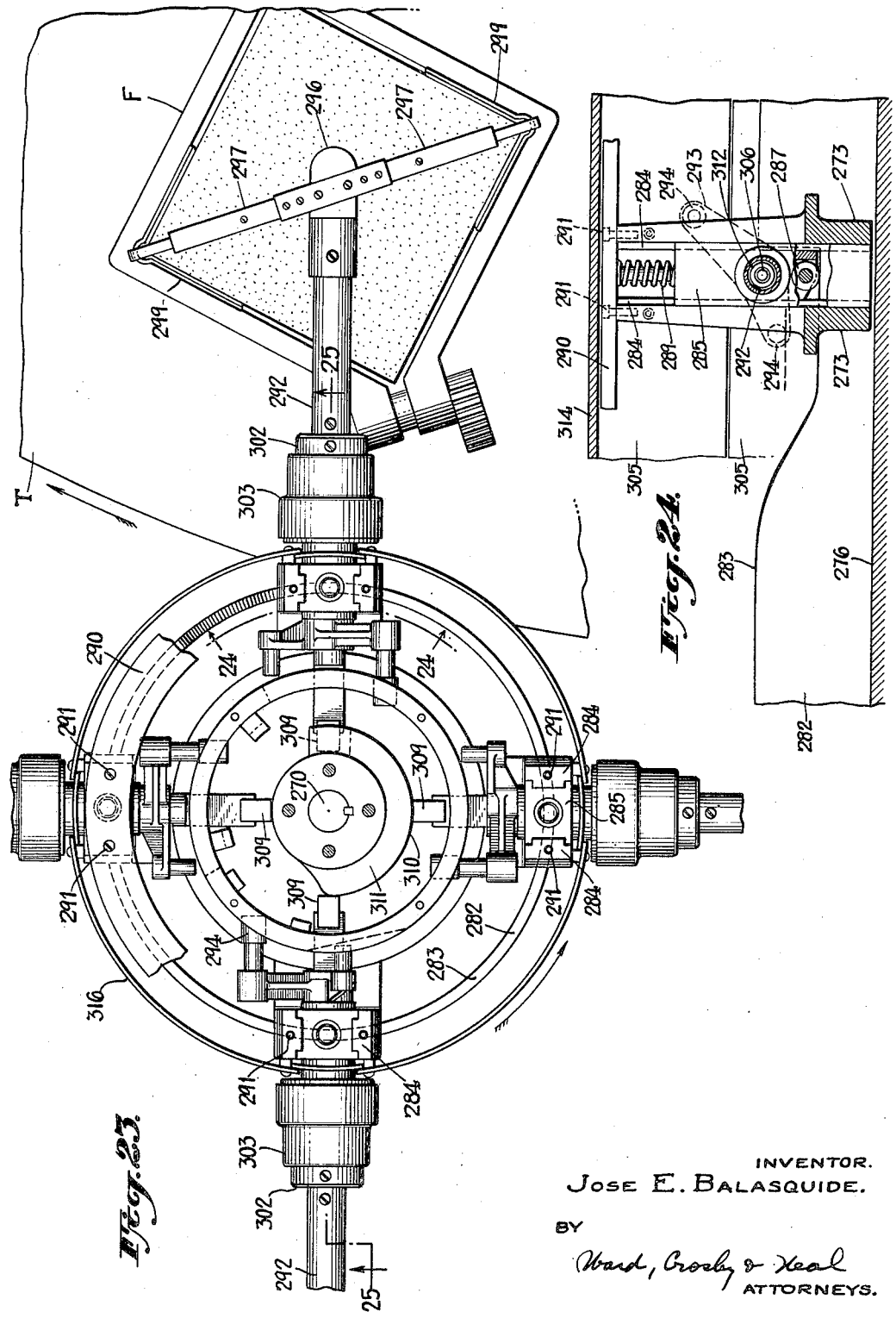

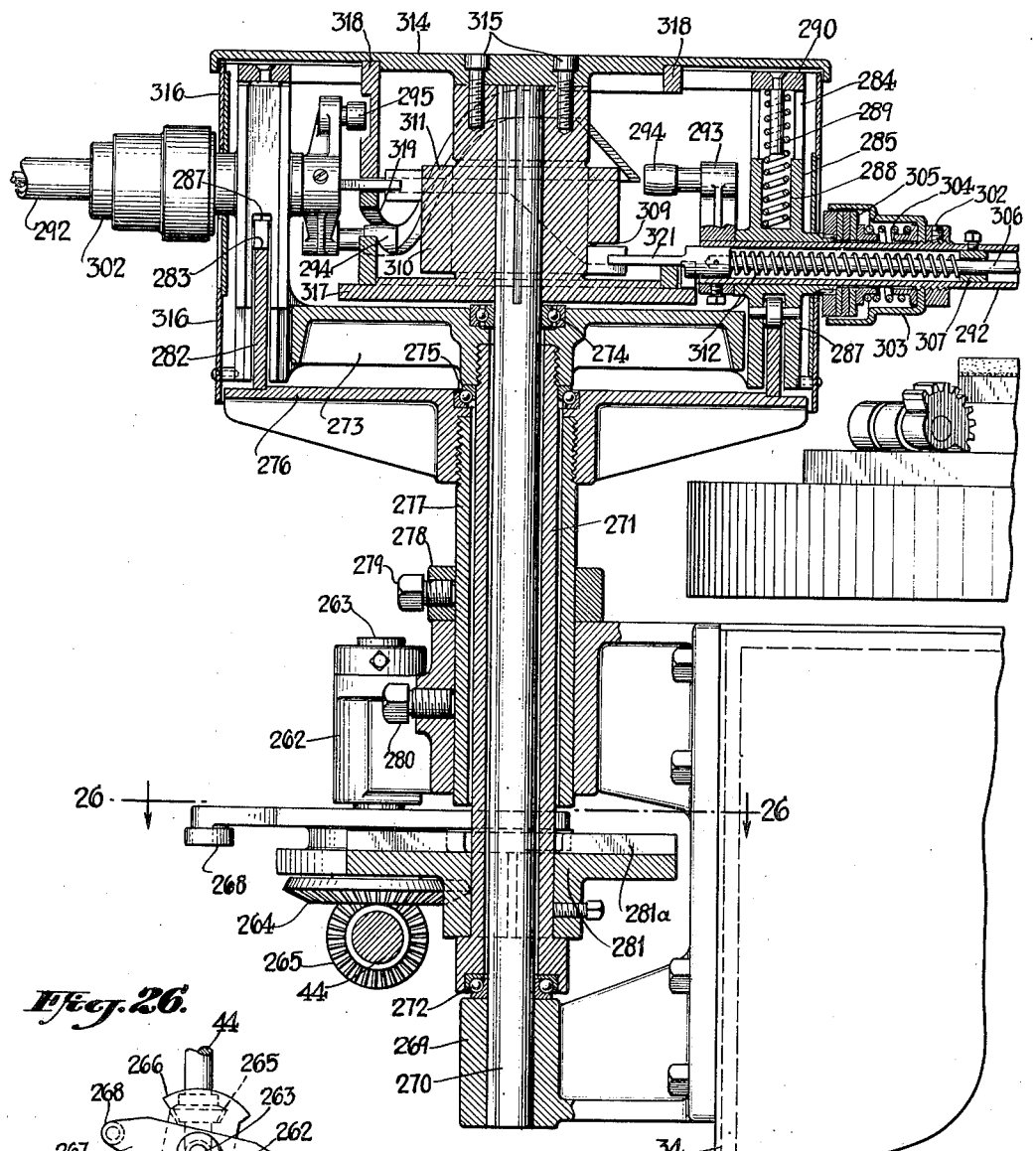
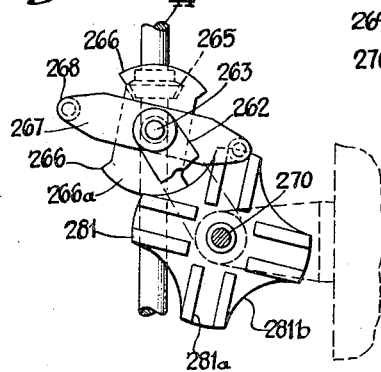

Feb. 28, 1950   J. E. BALASQUIDE   2,499,209
MACHINE FOR MOLDING ARTICLES
Filed Oct. 20, 1945   15 Sheets-Sheet 13
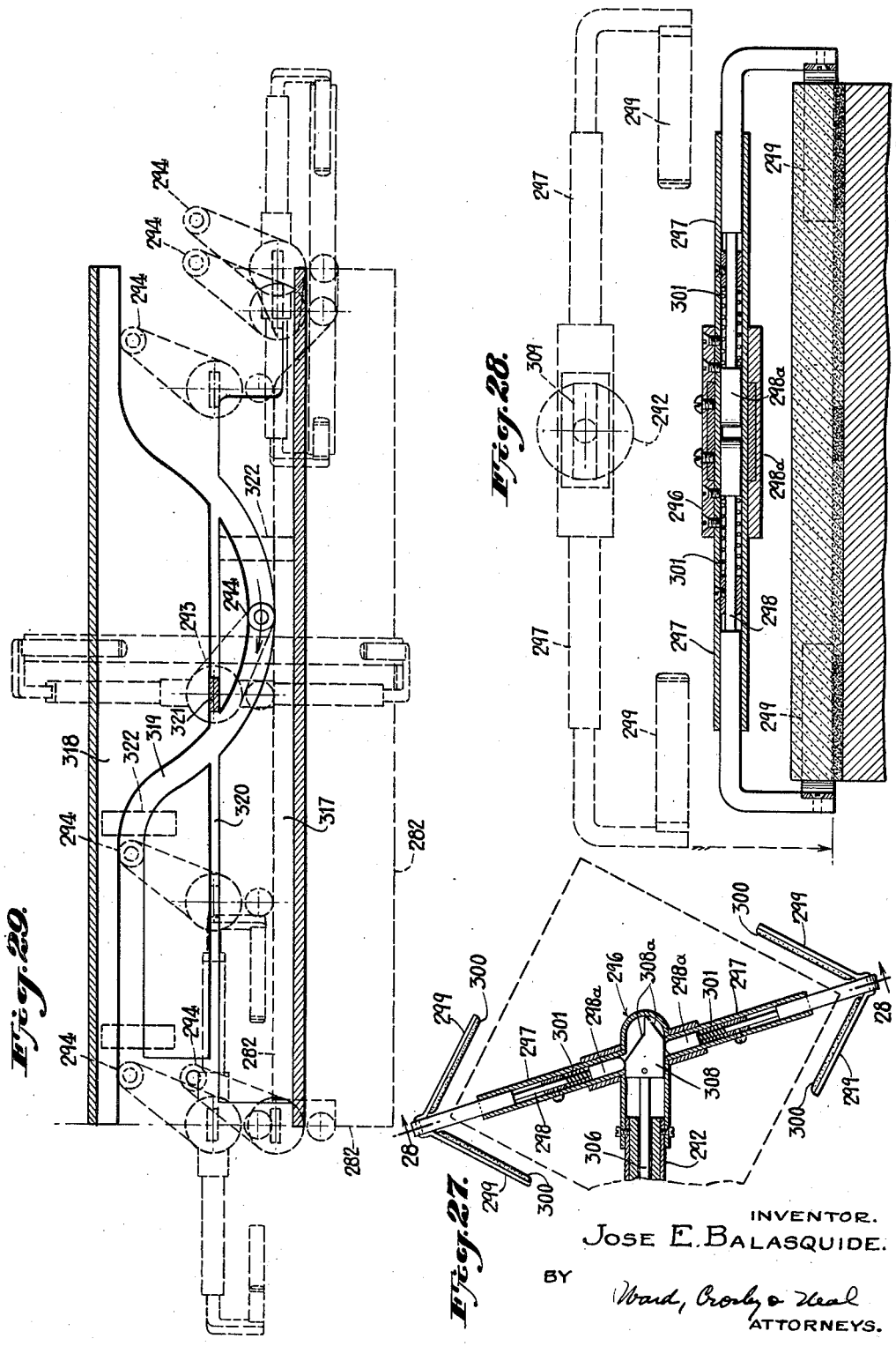
INVENTOR.
JOSE E. BALASQUIDE.
BY
Ward, Crosby & Neal
ATTORNEYS.

Feb. 28, 1950
J. E. BALASQUIDE
2,499,209
MACHINE FOR MOLDING ARTICLES
Filed Oct. 20, 1945
15 Sheets-Sheet 14
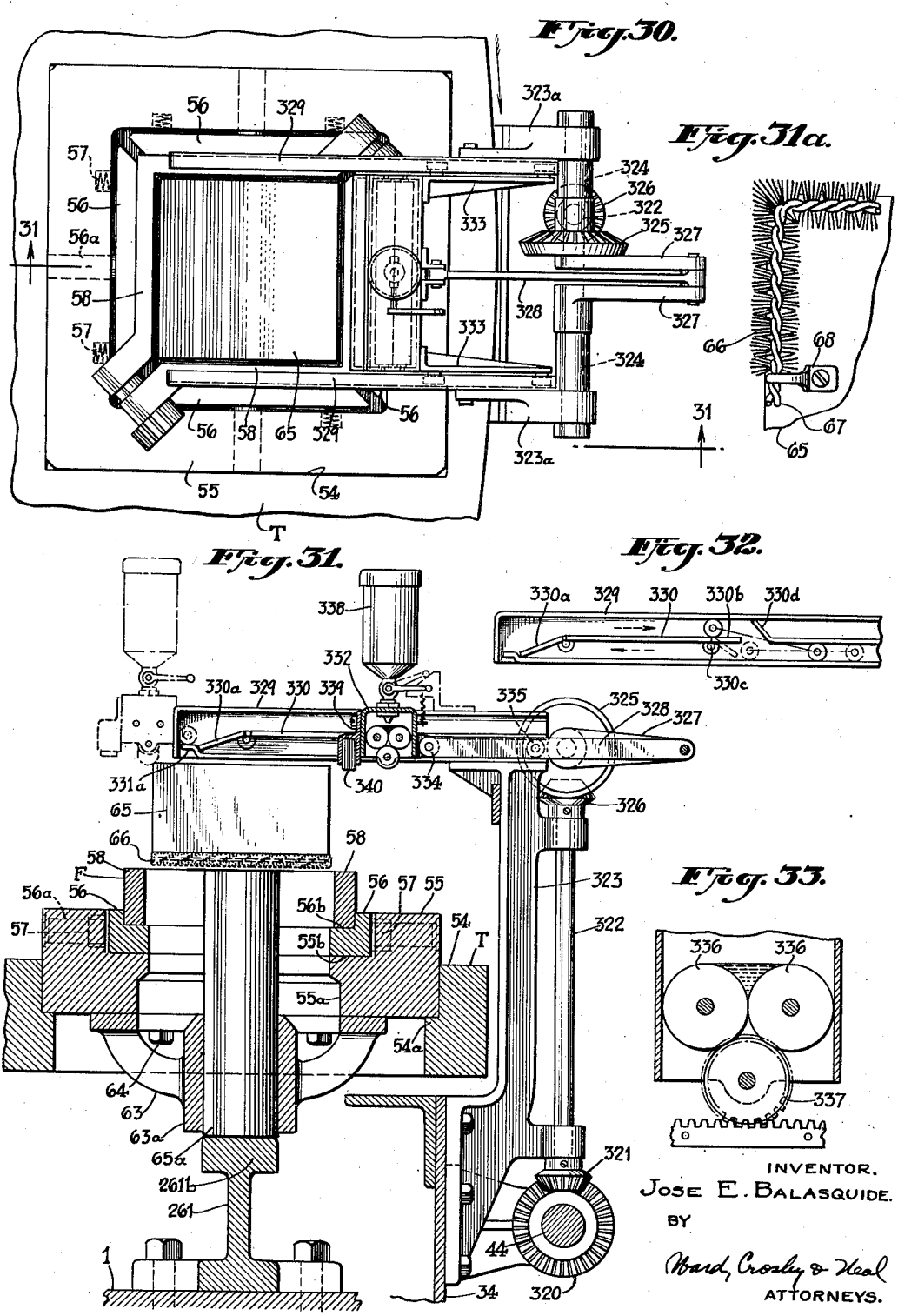
INVENTOR.
JOSE E. BALASQUIDE.
BY
Ward, Crosby & Neal
ATTORNEYS.

Feb. 28, 1950 — J. E. BALASQUIDE — 2,499,209
MACHINE FOR MOLDING ARTICLES
Filed Oct. 20, 1945 — 15 Sheets-Sheet 15

INVENTOR.
JOSE E. BALASQUIDE
BY
Ward, Crosby & Neal
ATTORNEYS.

Patented Feb. 28, 1950

2,499,209

UNITED STATES PATENT OFFICE 2,499,209

MACHINE FOR MOLDING ARTICLES

José E. Balasquide, Ponce, P. R.

Application October 20, 1945, Serial No. 623,596

25 Claims. (Cl. 25—41)

My invention relates to an automatic machine for producing molded articles or products.

In accordance with my invention, the automatic machine hereinafter described is utilizable for producing selected products or articles such, for example, as tiles either of the floor, siding, roofing or other type, shingles, slabs, bricks or blocks. Hereinafter, in this specification, products or articles of the character referred to above are generically termed "tiles." These tiles may have selected size and configuration as desired. They may be colored or non-colored and, if colored, the coloring (whether of one or more colors) may present or have a selected design or ornamental effect. The tiles, on the face thereof which is to be exposed to view, may be either plain, contoured or corrugated as desired. Suitable materials such, for example, as cementitious materials, clays, fibrous materials, asphalt or compositions of materials may be utilized for forming the tiles. If the material to be molded is to be colored, suitable coloring material may be incorporated therein at the proper time during operation of the machine to produce the desired effect.

The tile-producing machine of my invention is formed from a plurality of units which operate automatically in timed relation to perform the various essential steps incident to the rapid production of high-quality tiles in an inexpensive manner.

An important feature of the machine relates to the combination of a multi-unit molding table movable step-by-step to different operative stations and a conveyor timed therewith which is utilizable for successively depositing chamber-forming patterns in the respective forms or molds at one station and removing them therefrom at another station, the combination being characterized by the provision of an arrangement for supplying coloring material to the pattern chambers while it is disposed within a mold.

Another important feature of the machine relates to the combination described above with which there is associated units automatically operable to vibrate each form or mold, to fill each mold with tile-forming material, to level such material after the filling operation is completed, to apply high pressure to the material contained in each mold, to open the molds and to remove the formed tiles therefrom at a discharge station.

Another important feature of the machine relates to mold opening and closing mechanism together with an associated arrangement for cleaning the molds and for applying a film of oil or the like to surfaces of the mold which are to be subsequently engaged by the material to be molded.

Various other objects, advantages and features of my invention will become apparent from the following detailed description.

My invention resides in the tile-producing machine, combinations and arrangements of the character hereinafter described and claimed.

For an understanding of my invention and for an illustration of one form of my novel machine, reference is to be had to the accompanying drawings, in which:

Fig. 2 is a vertical sectional view, partly in elevation, taken on the line 2—2 of Fig. 1 looking in the direction of the arrows;

Fig. 2a is a vertical sectional view, partly in elevation, showing a detailed feature of the invention;

Fig. 3 is an enlarged, transverse, horizontal sectional view, partly in plan, taken on the line 3—3 of Fig. 2 looking in the direction of the arrows;

Fig. 3a is a vertical sectional view showing the valve of Fig. 3;

Fig. 4 is a horizontal sectional view, partly in plan, taken on the line 4—4 of Fig. 2 looking in the direction of the arrows;

Fig. 5 is a vertical sectional view taken on the line 5—5 of Fig. 4 looking in the direction of the arrows;

Fig. 5a is a vertical sectional view, partly in elevation, showing a detailed feature of the invention;

Fig. 6 is an enlarged plan view showing a part of my novel machine;

Fig. 7 is a vertical sectional view, partly in elevation, taken on the line 7—7 of Fig. 6 looking in the direction of the arrows;

Fig. 8 is a vertical sectional view, partly in elevation, taken on the line 8—8 of Fig. 7 looking in the direction of the arrows;

Fig. 9 is a horizontal sectional view, partly in plan, taken on the line 9—9 of Fig. 7 looking in the direction of the arrows;

Fig. 10 is a vertical sectional view, partly in elevation, taken on the line 10—10 of Fig. 6 looking in the direction of the arrows;

Fig. 10a is a vertical sectional view partly in elevation, taken on the line 10a—10a of Fig. 6 looking in the direction of the arrows;

Fig. 11 is a vertical sectional view, partly in elevation, taken on either of the lines 11—11 of Figs. 6 and 10 looking in the direction of the arrows;

Fig. 11a is a vertical, sectional view, partly in elevation, showing a track-supporting arrangement;

Fig. 12 is a vertical, sectional view, partly in elevation, illustrating a modified pattern holder;

Fig. 13 is a plan view showing a design-forming pattern;

Fig. 14 is a vertical sectional view, partly in elevation, taken on the line 14—14 of Fig. 1 looking in the direction of the arrows;

Fig. 15 is an enlarged, vertical sectional view, partly in elevation, taken on the line 15—15 of Fig. 14 looking in the direction of the arrows;

Fig. 16 is a plan view showing mechanism for material-leveling;

Fig. 17 is a vertical sectional view, partly in elevation, taken on the line 17—17 of Fig. 16;

Fig. 18 is a fragmentary, plan view illustrating a portion of the mechanism shown in Fig. 16, cooperating parts being illustrated in a different relation;

Fig. 19 is a vertical sectional view, partly in elevation, taken on the line 19—19 of Fig. 17 looking in the direction of the arrows;

Fig. 20 is a plan view showing mold opening mechanism;

Fig. 21 is a vertical sectional view, partly in elevation, taken on the line 21—21 of Fig. 20;

Fig. 21a is a sectional view taken on line 21a—21a of Fig. 21;

Fig. 22 is a plan view, partly in section, showing a part of the mold opening mechanism;

Fig. 23 is an enlarged plan view showing the tile-removing mechanism of my invention;

Fig. 24 is a vertical sectional view, partly in elevation, taken on the line 24—24 of Fig. 23 looking in the direction of the arrows;

Fig. 25 is a vertical sectional view, partly in elevation, taken on the line 25—25 of Fig. 23 looking in the direction of the arrows;

Fig. 26 is a horizontal sectional view, partly in plan, taken on the line 26—26 of Fig. 25;

Fig. 27 is a horizontal sectional view showing the tile-holding mechanism in open position;

Fig. 28 is an enlarged, sectional view taken on the line 28—28 of Fig. 27 looking in the direction of the arrows;

Fig. 29 is a diagrammatic view illustrating the operation of the tile-removing mechanism;

Fig. 30 is an enlarged plan view showing the cleaning and oiling mechanism of the invention;

Fig. 31 is a vertical sectional view, partly in elevation, taken on the line 31—31 of Fig. 30 looking in the direction of the arrows;

Fig. 31a is a fragmentary view of the brush means, as shown in Fig. 31, which are employed for cleaning the mold members 58;

Figs. 32 and 33 are enlarged sectional views, partly in elevation, showing detailed features of the invention;

Figure 1:
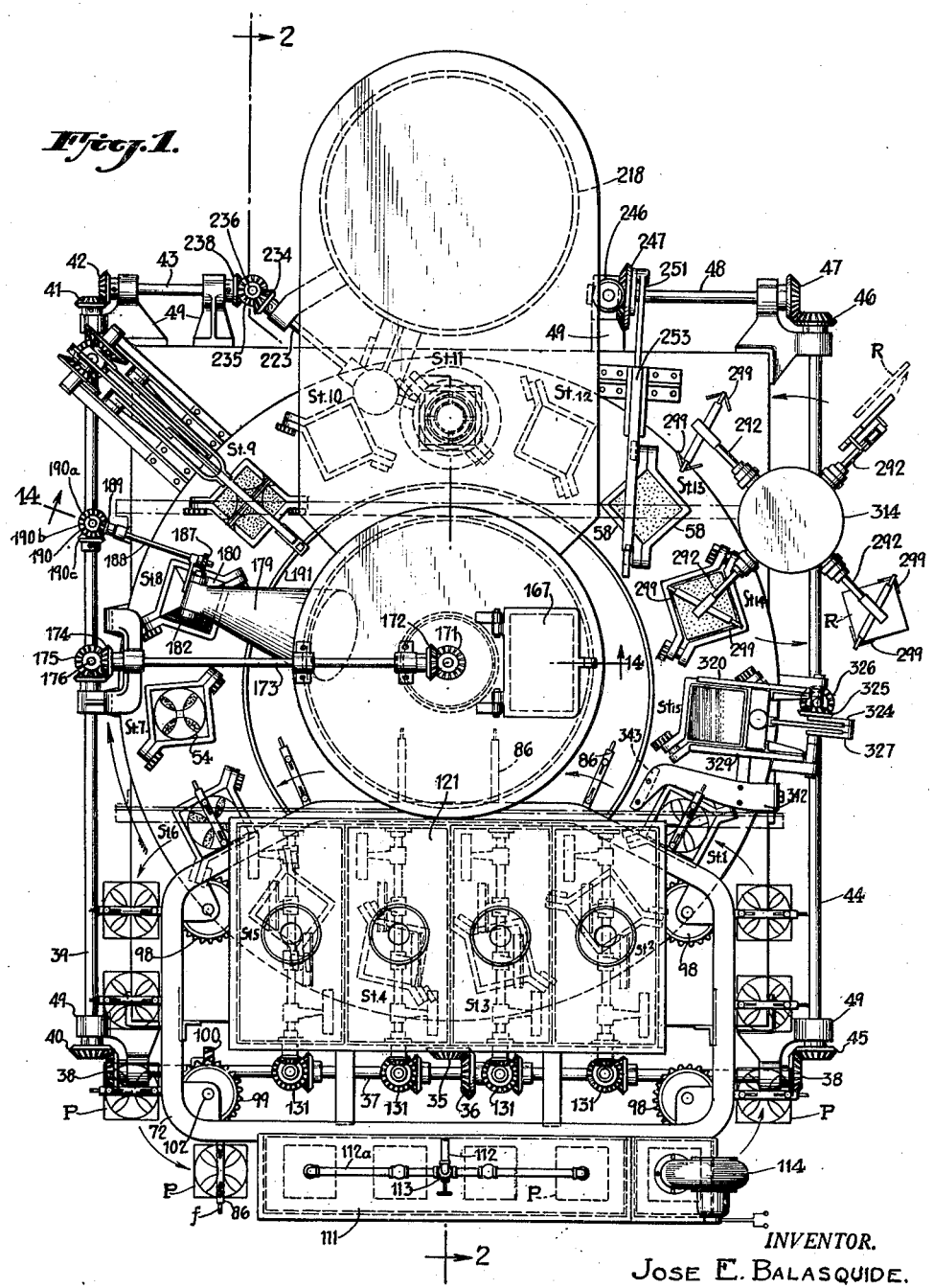
Figure 1 is a plan view showing the molding machine of my invention.

Referring particularly to Fig. 2, I have shown a suitably reinforced base 1 which is supported horizontally on a floor or other suitable surface. Suitably secured to the upper surface of the base 1, as by screws 2, Fig. 3, is the flange of a vertical, internally threaded collar 3 having a vertical cylinder 4 threaded thereto. At its upper end, the cylinder 4, supports an anti-friction device 5 which, in turn, supports a tubular stem 6 formed integrally with a horizontal table T. Secured to the stem 6 for rotatable movement therewith is the upper end of a rod 7 which extends downwardly through the cylinder 4 and has the lower end thereof journaled in an upstanding lug 1a, Fig. 3, of the base 1. Disposed between a lower shouldered surface of the rod 7 and the upper surface of the lug 1a is an anti-friction thrust bearing 8 which takes the weight imposed on the rod 7. Thus, in the manner described, the table T is freely supported for rotatable movement about the longitudinal axis of the rod 7.

Referring to Figs. 2 and 4, an electrical motor 9 is shown as secured to a pad upstanding from the base 1. The armature shaft of the motor 9 delivers power to gear reduction mechanism, not shown, disposed in a gear box 10 supported by the pad last named. A shaft 11 receives power from the aforesaid gear reduction mechanism and said shaft 11 carries a multi-groove pulley 12 disposed in the same vertical plane with a similar pulley 13 secured to one end of a shaft 14 journaled in alined bearings formed at the respective upper ends of standards 15 secured to and upstanding from the base 1. Coactable with the respective pulleys 12 and 13 are a plurality of endless belts 16 utilizable for transmitting power from the pulley 12 to the pulley 13.

Secured to the shaft 14 is a bevel gear 17 which meshes with and drives a bevel gear 18 rotatable with a shaft 19 journaled in a bearing formed by a member 20 having a depending section 20a which is suitably secured to the base 1.

The shaft 19 has secured thereto a sleeve 21 having formed integrally therewith lower and upper members 22 and 23 forming part of a Geneva movement. The lower member 22 is symmetrically disposed on opposite respective sides of the shaft 19 and terminates in the oppositely disposed arcuate surfaces 22a. Similarly, the upper member 23 is symmetrically disposed on opposite respective sides of said shaft 19 and each end thereof carries a depending roller 24.

A vertical shaft 25 is journaled in another bearing formed by the aforesaid member 20. The shaft 25 has secured thereto a sleeve 26 having formed integrally therewith a disk 27 forming another part of the aforesaid Geneva movement. As shown, the disk 27 has four radial grooves 27a formed on the upper surface thereof. These grooves are spaced in right-angular relation with respect to each other and, between each set of grooves, the disk 27 is shaped arcuately as indicated at 27b. The shaft 25 extends above the member 20 where it has a gear wheel 28 secured thereto for rotatable movement therewith. The gear wheel 28 meshes with a gear wheel 29 suitably secured to the lower end of a sleeve 30 which, at its upper end, is secured by screws 31 to the respective bosses 32 which depend from and are formed integrally with the aforesaid table T.

In view of the foregoing description, it will be understood that operation of the motor 9, through the described chain of mechanism, causes rotation of the member 23 in a clockwise direction, Fig. 4. The rollers 24 of the member 23 successively coact with the surfaces defining the respective grooves 27a of the disk 27 to impart step-by-step rotative movement to the latter in a counterclockwise direction, Fig. 4. By reason of the connection afforded by the gear wheels 28 and 29, the movement thus imparted to the disk 27 is transmitted to the table T to effect step-by-step rotative movement thereof in a clockwise direction, Fig. 4. With the form of the invention herein disclosed, although not necessarily, the speed of the motor 9 is so chosen and the design of the power-transmitting mechanism including the Geneva movement is of such character that the table T moves through an angle of twenty-four (24) degrees each time that a step of rotative movement is imparted thereto. In other words, the table T requires fifteen (15) steps of movement for a given point thereon to travel through an angle of 360 degrees. It will be understood that an arcuate surface 22a of the member 22 coacts with an arcuate surface 27b of the disk 27 during each stationary period of the latter. In this known manner, the disk 27 is anchored against undesired movement at those times when no power is being transmitted thereto by the member 23.

Referring to Figs. 1, 2 and 4, the hereinbefore described base 1 is shown as generally square except at the rear thereof where there is a central offset section. The base 1, throughout the periphery thereof, is shown as supporting an upstanding, vertical wall 34 which is suitably braced and supported so as to form a supporting structure utilizable as hereinafter described.

The hereinbefore described shaft 14 extends through the wall 34 at the front of the machine and has a bevel gear 35 secured to the end thereof, Figs. 2 and 4. Meshing with the bevel gear 35 is a bevel gear 36 secured to and rotatable with a horizontal shaft 37 terminating adjacent the respective sides of the machine, the ends of said shaft 37 carrying the respective bevel gears 38. A horizontal shaft 39 has a bevel gear 40 secured to the front end thereof in meshing engagement with one of the bevel gears 38, the shaft 39 extending along one side of the machine and having a bevel gear 41 secured to the rear end thereof. Meshing with the bevel gear 41 is a bevel gear 42 secured to one end of a horizontal shaft 43 which extends toward the offset section of the wall 34. At the other side of the machine, a horizontal shaft 44 has a bevel gear 45 secured to the front end thereof in meshing engagement with the other bevel gear 38, the shaft 44 extending along one side of the machine and having a bevel gear 46 secured to the rear end thereof. Meshing with the bevel gear 46 is a bevel gear 47 secured to one end of a horizontal shaft 48 which extends toward the offset section of the wall 34.

The shafts 37, 39, 43, 44 and 48 are rotatably supported in suitable brackets 49 secured to the wall 34. Under the control of the motor 9, all of these shafts rotate at constant, uniform speed. They are utilized for timing and control purposes in the manner hereinafter described. In the form of the invention herein shown, each of the aforesaid shafts rotates once through an angle of 360 degrees for each cycle of movement of the machine, i. e., while the table T is pausing once and moving through one step of its indexing movement.

Referring to Fig. 1, the table T, in the form of the invention herein shown, is provided, adjacent its periphery, with fifteen square passages 54 which are spaced in symmetrical relation with respect to each other with the longitudinal axis of each passage extending vertically. That is, there is an angle of twenty-four (24) degrees between each pair of adjacent passages 54.

As shown particularly in Fig. 31, the surface of each passage 54 is defined in part by a square flange 54a which forms a seat for a square block 55, Figs. 30 and 31, having a square passage 55a, the longitudinal axis of which coincides with that of the passage 54 in which said block 55 is seated. The block passage 55a is defined in part by a square flange 55b, Fig. 30, which forms a seat for four follower bars 56 disposed at the respective sides of the block passage 55a. Each bar 56 comprises a guide pin 56a mounted for free movement in a guide passage provided therefor in the block 55. A pair of springs 57 engages each bar 56 to bias the same toward the center of the block passage 55a, these springs 57 being seated in recesses provided, respectively, therefor in the block 55.

Each follower bar 56 is flanged as indicated at 56b and these flanges cooperate to define a seat for a pair of form members 58 which, with the hereinafter described base plate, cooperate to define the form or mold F of my invention. Each form member 58 has right-angle shape and the respective sides thereof are engaged by a pair of the bars 56 which are disposed in right-angle relation to each other. Each form member 58, at each end thereof, comprises an obliquely arranged ear 58a. The arrangement is such that, at the respective diagonal corners of the form F, there are pairs of the ear 58a, the ears of each pair being disposed in spaced, parallel relation.

At one diagonal corner of the form F, Fig. 22, one of the ears 58a of the pair of ears is shown as having journaled therein a shaft 59 having a gear segment 60 secured to one end thereof. The other end of the shaft 59 is threaded as indicated at 59a for cooperation with an internally threaded passage formed in the adjacent ear 58a. Preferably, for dust-guarding purposes, one ear 58a carries a spring-biased cylindrical guard 61 adapted to be received in a passage 62 of corresponding configuration formed in the adjacent ear 58a.

In accordance with the invention, the pair of ears at the opposite diagonal corner of the form F have associated therewith mechanism which is a duplicate of that last described. Accordingly, in each instance, the same reference character has been applied to duplicate parts. From a consideration of Fig. 20, it will be observed that the two gear segments 60 are disposed in a single plane. Hence, they may readily be actuated in unison in the manner hereinafter described.

Referring particularly to Fig. 31, a spider 63 is shown as secured to the bottom surface of the block 55 in suitable manner, as by screws 64. The spider 63 comprises a central, tubular portion 63a having its longitudinal axis disposed vertically for the free slidable reception of a rod 65a which is secured to or formed integrally with a base plate 65, the upper surface of which should be highly polished. The latter is square in cross-section and has exterior dimensions the same as the interior dimensions of the square form F when the form members 58 are closed. As illustrated in Fig. 31a, a suitable brush 66 is secured to the bottom surface of the base plate 65. The brush bristles extend outwardly beyond each side of the base plate 65 and they may be supported by twisted wires 67 which are secured to the bottom base plate surface by clips 68.

It will be understood, in view of the foregoing description, that, at the respective table passages 54, there are duplicate molding arrangements, each of which is formed from a block, a pair of form members, a base plate and associated parts of the character illustrated in Figs. 30 and 31. As the table T is indexed or moved step-by-step throughout its circular path of movement, the molding arrangements aforesaid pause successively at different locations which will hereinafter be referred to as stations or positions designated in Fig. 1 as St. 1 (Station 1), St. 2 (Station 2) ... St. 15 (Station 15).

The form or mold F per se is constituted by the two form or mold members 58 and the base plate 65. These parts are in operative condition or closed when the form members 58 are positioned as illustrated in Fig. 16 and when the base plate 65 is in the lower position shown by the broken lines of Fig. 31. When each form F arrives Station 1, it is in the operative or closed position described immediately above.

If colored tiles are to be produced, a device P, hereinafter referred to as a "pattern," is deposited in each closed form F while the latter pauses at Station 1. Further, in accordance with the invention as disclosed, each form F, with a pattern P therein, moves from Station 1 to Station 6 and, during the pause at Station 6, each pattern P is removed from its form. Mechanism utilizable for this purpose will now be described.

A plurality of vertical angle members 70, Figs. 4 and 6, are shown as secured exteriorly to the front section of the hereinbefore described wall 34. As shown in Fig. 6, a plurality of columns 71 are shown as upstanding from the base 1 to which they are secured in suitable manner. These members 70 and columns 71 are connected in supporting relation to an inner, horizontal track 72 in any suitable manner. Thus, as indicated in Fig. 11a, a member 70 is connected to said inner track 72 by screws 73. A generally similar arrangement may be provided for connecting the inner track 72 to the columns 71. An outer, horizontal track 74 is disposed adjacent the inner track 72 in uniform spaced relation with respect thereto. One or more plates 75 is or are secured by screws 76 to the upper surfaces of the tracks 72 and 74 to support the track 74 and maintain the tracks in spaced relation.

As shown in Fig. 6, the two tracks comprise a section at the front of the machine which is disposed parallel with and outwardly of the front section of the wall 34. At the respective sides of the machine, there are sections of the two tracks which are disposed at right angles to the aforesaid front track section. The track sections last noted merge into angular track sections which are connected by a rear track section extending parallel with the front track section. One angular track section extends transversely of the path of form travel at the front of Station 1 whereas the other angular track sections extends transversely of the path of form travel at the rear of Station 6, Fig. 6.

Each of the tracks 72 and 74, adjacent the respective upper ends thereof, are flanged as indicated at 78, Figs. 11 and 11a. A plate 79, Figs. 10 and 11, carries forward and rear horizontal pins disposed at the upper end thereof. Each of these pins supports a pair of rollers 80 which are disposed at the respective opposite sides of the plate 79 and are adapted to rest upon the respective track flanges 78. The plate 79, below the rollers 80 is shown as carrying forward and rear rollers 81 which are rotatable, respectively, about vertical axes, the rollers 81 engaging the inner track surfaces.

A central section of the plate 79 extends below the tracks 72, 74 and terminates in a pair of spaced, horizontally extending ears 79a which freely support a pair of spaced vertical pins 82 of a sprocket chain 83, each pin 82 supporting a sprocket chain roller 84.

Suitably secured, as by a screw 85, to the aforesaid central section of the plate 79 which is disposed below the tracks 72, 74 is a horizontal supporting tube 86 provided with a fixed transverse wall 87 approximately midway between the ends thereof.

At the left of the wall 87, a plunger 88 is freely slidable within the tube 86, this plunger being biased from right to left, Fig. 11, by a spring 89 having one end in engagement with the plunger and the other end in engagement with the wall 87. The tube 86 comprises upper and lower slots disposed in a vertical plane. Carried by the plunger 88 is a vertical post 90 which extends through the upper tube slot and forms a support for a vertical sleeve 91 engaged, on its inner surface and in freely slidable relation, by an annular surface 92a of a member 92, one end of which terminates above the sleeve 91. The member 92 extends, in freely slidable relation, downwardly through the post 90, the plunger 88 and the lower tube slot. The lower end of the member 92 serves as a finger f formed from an angular section 92b and a horizontal end section 92c. As shown in Fig. 11, a helical spring 93 is disposed within the sleeve 91 and functions to bias the member 92 in an upward direction, this movement being discontinued when a pin 92d carried by the annular surface 92a engages a surface defining the top of an elongated slot provided therefor in the sleeve 91.

At the right of the wall 87, Fig. 11, there is an arrangement which is a duplicate of that described above at the left of the wall 87. Accordingly, in each instance, the same reference character has been applied to duplicate parts. It will be noted that the spring 89 at the right of the wall 87 biases the plunger 88 from left to right, Fig. 11, and that the finger f associated with said last named plunger faces in an opposite direction from the finger f first named. However, both fingers f are disposed and remain at all times in the same vertical plane.

Referring to Fig. 13, I have shown a pattern P formed from four duplicate side walls 94 arranged in right-angular relation and hence defining a chamber which is square in transverse section. As illustrated, loop-shaped handles 95 are secured, respectively, to two of the walls 94 which are disposed in facing relation. Disposed within the aforesaid chamber is a circular wall 96 having a diameter corresponding with an internal, transverse dimension of said chamber. Disposed within the chamber defined by the circular wall 96 are four arcuate walls 97 symmetrically arranged with respect to each other to form a design having the desired appearance. The walls 94, 96 and 97 are suitably secured together in the relation shown and are formed from suitable material such, for example, as thin sheet steel.

In the full line showing of Fig. 11, a pattern P is represented as held in elevated position by the fingers f. As will be noted the pattern handles 95 are engaged with the respective fingers f at the junction of the angular sections 92b with the respective vertical sections of the members 92. As shown by the full lines in Fig. 11, all of the springs 89, 89 and 93, 93 are expanded. Accordingly, the fingers f remain in the respective illustrated positions to positively retain the pattern P in elevated position. As hereinafter described, in order to lower the pattern P, the members 92 are moved toward each other against the expansive effect of the springs 93. In order to elevate said pattern P, the members 92 are moved toward each other against the expansive effect of the springs 93 and, simultaneously, said members 92 are lowered against the expansive effect of the springs 93; at the proper time, all of the springs are released to thereby elevate the pattern.

In accordance with the invention, the tracks 72, 74 support a desired number of the plates 79 which may be secured, in the manner described with respect to the aforesaid plate 79, in uniform, spaced relation to the sprocket chain 83. It will be understood that the plates 79 are duplicates and that each of them supports a set of parts which are duplicates of the respective parts carried by the first described plate 79. Each plate 79, then, supports a tube 86 and the latter, in turn, movably supports the fingers $f$ which serve, as stated, to support a pattern P. Hereafter, in this specification, each complete mechanism referred to above will be designated the "pattern support."

As indicated in Fig. 6, the above described sprocket chain 83 engages a plurality of suitably journaled, idler sprocket wheels 98 and a suitably journaled driven sprocket wheel 99. For driving the sprocket wheel 99, the hereinbefore described shaft 37, Fig. 6, is shown as having secured thereto a gear wheel 100 which meshes with and drives a gear wheel 101 secured to the lower end of a suitably journaled, vertical shaft 102 which, at its upper end, has the above described sprocket wheel 99 secured thereto. Accordingly, during operation of the machine, the sprocket chain 83 moves continuously and at uniform speed in a counter-clockwise direction, Fig. 6, and carries the uniformly spaced pattern supports therewith. The timing and arrangement is such that, just after each step of movement of the table T has been completed, the sprocket chain 83 moves one pattern support above Station 1 and another pattern support above Station 6.

Referring to Fig. 13, a line L is represented which is perpendicular to one pair of opposite side walls 99 of the pattern P midway between the ends of said pattern walls. Another line L1 is represented which is perpendicular to the other pair of opposite side walls of the pattern midway between the ends of the pattern walls last named. The point of intersection of the lines L and L1 coincide with the center of the pattern P.

A form F is shown as positioned at Station 1 in Fig. 6 and a line M is represented which is perpendicular to one pair of opposite walls of said form F midway between the ends of said form walls. Another line M1 is represented which is perpendicular to the other pair of opposite walls of the stationary form F midway between the ends of the form walls last named. The point of intersection of the lines M and M1 coincides with the center of the form F.

When the forms F are square in transverse section as hereinbefore described, each of the patterns P, likewise, is square in transverse section. However, each pattern P is smaller than each form F to such slight extent that, when a pattern is disposed in any form, the adjacent form and pattern surfaces are in close engagement. It will be understood that the fit between pattern and form should not be so close as to prevent ready insertion of a pattern in a form or removal therefrom.

In accordance with the invention, then, each pattern support continuously moves from Station 6 toward Station 1 and, while so doing, carries a pattern P, each pattern, during this movement, being held in elevated position as shown by the broken lines in Fig. 11. With a form F stationary at Station 1, the foremost pattern P carried by the sprocket chain 83 moves into a position thereabove and, just prior to the time that the center defined by the intersecting pattern lines L and L1 arrives vertically above the center defined by the intersecting form lines M and M1, the fingers $f$ carrying said pattern P are actuated, in the manner hereinafter described, to release the pattern. In connection with the foregoing, it will be understood that the angular track section at the front of Station 1 is so arranged that the pattern is guided for movement in such manner that the lines L, L1 are moved to positions vertically above the respective form lines M, M1.

Adjacent Station 1, Figs. 6, 10 and 11, a supporting plate 104 is shown as secured to the hereinbefore described plate 75 by screws 105, said plate 104 extending transversely with respect to the tracks 72 and 74 and being positioned above the path taken by the pattern supports. At its outer end, the plate 104 comprises a depending section 104a to which is suitably secured the angular end of a cam plate 106. The angular end of a duplicate cam plate 106 is supported in suitable manner, as by attachment to the outer surface of the track 74. As shown in Fig. 11, the cam plates 106 extend toward each other and they are disposed in the same horizontal plane.

Referring further to Fig. 11, a member 107 is shown as depending from and secured to the aforesaid plate section 104a. The member 107 terminates in a guide plate 108 which cooperates with another guide plate 109 secured to the track 72. The plates 108 and 109 are spaced apart a distance only slightly greater than the width of the pattern P.

While each pattern P is being carried toward Station 1, the parts carried by the pattern support are positioned as shown by the full lines in Fig. 11. That is, the springs 89, 89 and 93, 93 are fully expanded with the result that the plungers 88 are in their outer, respective positions while the members 92 are in their upper respective positions.

Under the control of sprocket chain 83, a pattern support and the thereby-carried pattern P arrive closely adjacent Station 1 and, during continued movement of said sprocket chain, the sleeves of the pattern support 91 are moved into engagement with the respective cam surfaces 106a, Fig. 6, of the cam plates 106. As a result, the sleeves 91 and the respective fingers $f$ carried thereby are moved, while compressing the respective springs 89 and 89, close to the respective positions thereof shown by the broken lines in Fig. 11, this action being accompanied by lowering movement of the pattern P, as the handles 95 slide down the respective angular sections 92b of the fingers $f$ and come to rest upon the respective horizontal finger sections 92c. Eventually, at substantially the exact time that the center of the pattern P arrives vertically above the center of the form F, the pattern sleeves 91 pass into engagement with the highest parts of the respective cam surfaces 106a whereupon the finger end sections 92b are disengaged from the respective pattern handles 95 and the pattern P drops into the form F. In connection with this operation, disengagement of the fingers from the pattern handles is rendered more positive by reason of the controlling or steadying effect of the plates 108, 109 on the pattern.

After the pattern sleeves 91 pass beyond the cam plates 106 as described above, the parts return to the respective positions thereof shown by the full lines in Fig. 11. That is, the springs 89, 89 return to fully expanded position with the result that the fingers f resume their outer, respective positions.

In a detailed manner, I have described the release of a pattern P from a pair of the fingers f as the same is effected at Station 1. It will be understood that forms F successively arrive and pause at this station and that, in the manner described, successive patterns P (which are continually moving toward Station 1) arrive above Station 1 and are detached from their respective sets of supporting fingers whereupon they drop one-by-one into the respective forms F.

Referring to Figs. 6, 10a and 11, a second pair of cam plates 106 are shown as mounted in substantially the same relation to Station 6 as was previously described with respect to the cam plates 106 at Station 1. In addition, at Station 6, the lower surface of the supporting plate 104 is shown as having secured thereto a cam plate 110, which extends transversely of the path of movement of the pattern supports.

Under the control of sprocket chain 83, a pattern support (without a pattern) arrives closely adjacent Station 6 and, during continued movement of said sprocket chain, the sleeves 91 of the pattern support move into engagement with the respective cam surfaces 106a of the cam plates 106. Substantially simultaneously, the upper ends of the members 92 move into engagement with the cam plate 110. As a result, the sleeves 91 are moved toward each other and the members 92 are moved downwardly. This movement continues until the respective finger end sections 92b are disposed inwardly of, opposite, and at the same level as the openings defined by the handles 95 of that pattern P then in the form F which is stationary at Station 6. Just as the finger end sections 92b are thus positioned, the sleeves 91 pass beyond the respective cam surfaces 106a and the members 92 pass beyond the cam 110. Accordingly, the springs 89, 89 and 93, 93 become effective, by snap action, to position the fingers f as shown by the full lines in Fig. 11 whereby the pattern P is elevated from the form F. As indicated in Fig. 10a, plates 108 and 109 similar to those previously described should be located at Station 6 so as to insure proper engagement of each set of fingers f with each set of pattern handles.

Referring to Figs. 1 and 2, an elongated housing 111 is shown as forming an enclosure for the straight track section at the front of the machine. This housing is open at its ends so that the pattern supports and the supported patterns may enter the housing, pass therethrough and then pass therefrom. As illustrated, the top wall of the housing 111 supports an inlet pipe 112, which may be controlled by a valve 113; this pipe terminating in a nozzle-supporting header 112a. With an arrangement of the character described, it will be understood that the patterns P, as they pass through the housing 111, are sprayed with water under pressure which is emitted from the aforesaid nozzles and which escapes from the housing 111 by way of one or more vents 11a.

By utilizing and properly distributing a suitable number of these nozzles, the desired cleansing action (removal of undesired adhering color paste) proceeds in an expeditious manner. Adjacent the exit end of the housing 111, a motor-operated blower or fan 114 is disposed to direct a stream of air toward the oncoming patterns and their supports. This stream of air functions in a drying sense to remove excess moisture from the patterns.

In Fig. 12, I have shown a modified arrangement for actuating the fingers f. In this arrangement, the above described tube 86 is replaced by a tube 114 having plungers 115 freely movable in the respective end portions thereof, the respective plungers 115 supporting the posts 90 and the respective associated sets of parts in the same manner as hereinbefore described with respect to the plungers 88. Each plunger 115 carries a rack bar 116 and these rack bars are positioned at diametrically opposite sides of the tube 114. A pinion 117 coacts with both of the rack bars and is journaled approximately at the center of the tube 114 on a fixed pin 118. Helical springs 119 coact with the respective plungers 115 to bias them in opposite directions. The arrangement of Fig. 12 is advantageous in that a single cam 106 (instead of two cams) serves to control the position of the fingers f. In this connection, the rack bars 116 and interposed pinion 117 connect the two plungers together for movement toward or from each other in unison. Therefore, movement of the sleeve 91 at the left, Fig. 12, either under the control of the cam plate 106 or the spring 116 causes corresponding movement to be imparted to the sleeve 91. In this manner, the fingers f are moved either toward or from each other under the control of a single cam.

Referring to Figs. 1 and 2, a plurality of tanks or receptacles 120 are shown as grouped at the front of the machine above the path taken by the forms F while the respective patterns P are associated therewith. Each of the tanks or receptacles 120 contains a supply of colored paste which may be formed, as well understood in the tile-making art, from suitably proportioned quantities of a mineral pigment, cement and white sand with which water is admixed to form the aforesaid paste. Each tank 120 may have associated therewith a detachable cover plate 121 which may carry a funnel 122. The tanks 120 may be secured together in unitary fashion by vertical and horizontal members 123, 124 and they may be supported by horizontal members 125 secured, respectively, to the hereinbefore described vertical members 70. As shown in Fig. 2, the aforesaid horizontal members 125 may have the additional function of bracing the inner track member 72.

Referring particularly to Figs. 7 and 8, one of the hereinbefore described tanks 120 is shown as supporting a horizontal shaft 126 to which, by the respective arms 127, paddle wheels or stirrer members 128 are secured for rotatable movement therewith as a unit. One end of the shaft 126 extends beyond the front wall of the tank 120 and has secured thereto a bevel gear 129 which meshes with and is driven by a bevel gear 130 secured to and rotatable with a suitably journaled vertical shaft 131 having at its lower end a bevel gear 132 which meshes with a bevel gear 133 secured to and rotatable with the hereinbefore described shaft 37. The stirrer members 128 rotate continuously in response to the application of power thereto from the shaft 37. These stirrer members, during rotation thereof, agitate, mix and stir the paste contained in the tank 120.

As shown in Fig. 8, a suitable supporting housing 134 is secured to the lower surface of the tank 120, this housing defining a horizontal passage 134a disposed in parallel relation with respect to the above described shaft 126. Further, the housing 134 defines a lower discharge orifice 134b, Fig. 8. A tube 135 is mounted for free rotatable movement in the passage 134a of the housing 134 and opposite ends of said tube 135 are closed by the respective plugs 136 which are fixed thereto for rotatable movement therewith as a unit. The plug 136 at the right, Fig. 7, has a central passage in which is secured one end of a shaft 137 journaled in a bearing bracket 138 secured to and depending from the tank 120. The other end of the shaft 137 carries a bevel gear 139 which meshes with and is driven by a bevel gear 140 secured to and rotatable with the aforesaid shaft 131.

The tube 135, in the central portion thereof, comprises an elongated slot 135a adapted to be disposed in either registering or non-registering relation with respect to a generally similar elongated slot 120a formed in the bottom surface of the tank 120.

A pair of spaced plugs 141, mounted for free slidable movement in the tube 135, are adapted to control the effective length of the tube slot 135a. Any suitable arrangement may be utilized for maintaining each of the plugs 141 in any selected position to which adjusted. Thus, for example, each plug 141 may have secured thereto an actuating member 142 which extends freely through the adjacent fixed plug 136 and is maintained in fixed relation with respect thereto by a set screw 143, or equivalent.

Suitably secured to the orifice 134b, as by the members 144, is a distributor 145 which comprises four downwardly inclined spouts 145a arranged at right angles with respect to each other and separated from each by partitions 145b arranged in right-angular relation.

The tank 120 described above is so positioned that the distributor 145 associated therewith occupies a position above Station 2. When a form F and an associated pattern P arrive at this station, the pattern chambers c takes a stationary position vertically below the respective spouts 145a of the distributor 145. The tube 135 rotates continuously at slow speed in response to delivery of power thereto from the constantly rotating shaft 37. When the tube 135 is positioned as shown in Fig. 8, a charge of paste passes from the tank 120, through the tube slot 135a, enters and fills that portion of the tube 135 between the plugs 141. The tube 135, as it rotates, causes the tube slot 135a to move from registering position with the orifice 120a of the tank 120 thereby discontinuing passage of paste from said tank 120 to the interior of the tube 125. Eventually, during continued rotation of said tube 135, the passage 135a comes into registering relation with the orifice 134b whereupon the charge of paste passes to the distributor 145 and thence into the chambers c of the pattern P which is now stationary beneath said distributor 145, the paste coming to rest upon the upper surface of the form base plate 65.

It will be understood that the position of the plugs 141 may be changed, after loosening of the respective set screws 143, to thereby vary the size of the tube chamber which receives paste from the tank 120.

In accordance with a feature of the invention, although not necessarily, other tank and distribution arrangements of the character described above are positioned at the respective Stations 3, 4 and 5 and, as will be understood, the paste in the respective tanks 120 should have contrasting colors. The distributors 145 at the stations last named are of such slightly different character that, at Station 3, each chamber c1 of the pattern P receives a charge of paste. At Station 4, each pattern chamber c2 receives a charge of paste and, at Station 5, the pattern chamber c3 receives a charge of paste. All of the shafts 137 rotate constantly and the timing is such that the slots 135a discharge paste onto the respective distributors 145 at substantially the same time. At each of Stations 2, 3, 4 and 5, then, paste is being supplied to the respective sets of pattern chambers at substantially the same time while the table T remains stationary.

Referring to Figs. 7, 8 and 9, a pan 146 is shown as slidably mounted on the horizontal members 125. Secured to one end of the pan 146 is a member 147 to which is pivoted one end of an arm 148 secured to and rotatable with a horizontal shaft 149 rotatable in a suitably supported bearing. The other end of the shaft 149 carries a bevel gear 150 which meshes with and is driven by a bevel gear 151 secured to and rotatable with the aforesaid shaft 131. By the described mechanism, the pan 146 is moved from left to right and vice versa, Fig. 7. This pan has such length that it extends, when positioned as shown by the full lines in Fig. 7, beneath all of the distributors 145. The pan 146 arrives at this position just after all of the distributors 145 have completed the passage of paste to the respective pattern chambers. This pan receives drippings, if any, from the distributors and positively prevents the passage of paste toward the patterns while they are in movement. The timing is such that, during the next paste-charging operation, the pan 146 is positioned as shown by the broken lines in Fig. 7 and, hence, is ineffective to prevent passage of paste from the distributors to the pattern chambers.

In view of the foregoing, it will be understood that, at Station 5, the operation of passing colored paste to the pattern chambers is completed. All of said pattern chambers have now received the allotted charges of paste. After leaving Station 5, each form F and its associated pattern P passes to Station 6 where each pattern P is removed from its form in the manner hereinbefore described. The pattern has served its intended function of causing the formation, on the upper surface of the form base plate 65, of a color design of the desired appearance.

While each mold and associated pattern is passing from Station 5 to Station 6 in the manner described above, vibratory motion is imparted to each base plate rod 65a and, for this purpose, any suitable arrangement may be utilized. Thus, for example, as shown in Figs. 4 and 5, a suitable vibratory motor 155 may be secured to an upstanding pad formed integrally with the aforesaid base 1. The motor 155 comprises a vertical armature or armature extension 156 which, in freely slidable relation, supports a sleeve 157a formed integrally with a substantially horizontal plate 157 having ends which are downwardly inclined to some extent. A spring 158, or equivalent, coiled around or associated with the armature 156, normally holds the plate 157 in an upper position as shown by the dotted lines in Fig. 5 to the extent permitted by a pin 156a carried by the motor armature, said pin being received in an elongated slot formed in the sleeve 157a. Carried by and movable with the sleeve 157a is a finger 159 for operating a suitable sensitive switch 160 included in a conductor 161 which leads from one terminal of a source of electrical energy to the motor commutator 162, another conductor 163 connecting the commutator 162 with the other terminal of said source of electrical energy.

As shown in Fig. 4, the plate 157 is positioned between Station 5 and Station 6 and the height thereof is such that the rod 65a of each molding arrangement engages the same during movement thereof between said stations. Engagement of a rod 65a with the plate 157 causes depression thereof against the spring 153 with the result that finger 159 closes the circuit of switch 160 to energize the motor 155. When this happens, vibration of the motor 155 is transmitted to the plate 157 and hence to the rod 65a.

The vibratory movement which is thus imparted to the base plate rod 65a is transmitted to the mold and associated pattern with the result that the colored paste in the various chambers of the pattern P is settled, caused to become substantially level, and form a layer of design-forming colored paste as indicated at D, Fig. 17. This, as will be understood is highly desirable. Thereafter, the pattern is removed from the mold at Station 6 as described above.

After a mold with the color design on the upper surface of the base plate 65 leaves Station 6, it passes to Station 7 which, in the machine herein described is an idle station. That is, no operation is performed while a mold pauses at Station 7. After leaving Station 7, each mold is moved to Station 8 where it is filled, as indicated at D1, Fig. 17, with suitable tile-forming body material such, for example, as that which is formed from suitable proportioned quantities of coarse sand or the like, and either cement, clay, fibrous material or asphalt, or combinations thereof, such material being hereafter generically termed "cementitious material" or a "cementitious mixture."

Referring particularly to Figs. 1, 2, 4 and 14, a receptacle or storage bin 165 is shown as suitably supported at approximately the center of the machine above the table T. Suitably anchored supporting members 166 may be utilized for supporting the receptacle 165 in vertical position as shown particularly in Fig. 14.

A pivoted door 167 may be secured to the top wall of the receptacle 165 so that, through a chute 168 or the like, a cementitious mixture may be introduced into said receptacle 165. A vertical sleeve 169 is suitably secured at the center of the receptacle 165 for the reception of a conveyor 170 which, at its opposite shaft ends, is journaled in the respective upper and lower container walls. The sleeve 169 should comprise a plurality of lower apertures 169a through which the cementitious mixture passes to the interior, lower end of said sleeve 169. In response to rotation of the conveyor 170, the cementitious material is elevated through the sleeve 169 and subsequently returned to the receptacle through passages provided at the top of the sleeve. In this manner, the porosity of the cementitious mixture is maintained and undue packing thereof is prevented.

The supporting shaft of the screw conveyor 170 may be operated in any suitable manner. Thus, for example, a bevel gear 171 may be secured to the upper end of this shaft and meshed with a bevel gear 172 secured to one end of a suitably journaled, horizontal shaft 173. The other end of the shaft 173 carries a bevel gear 174 which meshes with and is driven by a bevel gear 175 secured to the upper end of a suitably journaled, vertical shaft 176. The lower end of the vertical shaft 176 carries a bevel gear 177 which meshes with and is driven by a bevel gear 178 secured to and rotatable with the hereinbefore described shaft 39, Fig. 4. As hereinbefore stated, the shaft 39 rotates continuously at uniform speed. By virtue of the described mechanical arrangement, the screw conveyor 170 partakes of similar rotative movement to thereby elevate the cementitious mixture for the purpose stated.

A pipe 179 communicates with the lower end of the receptacle 165, this pipe terminating in a diverging spout 180 forming an outlet passage which is positioned vertically above Station 8 and which is square in correspondence with the square configuration of the form or mold M. At its extreme lower end, the diverging spout 180 supports a suitable screen 181.

The end of the pipe 179 is shaped to define horizontally disposed bearings 182 which face each other for the reception of the respective ends of a tube 183 having an elongated slot 183a adapted to register either with the upper discharge end of the pipe 179 or with the passage defining the upper end of the diverging spout 180.

The aforesaid ends of the tube 183 may be encircled by felt washers 184 or the like to protect the bearing surfaces against the entrance of dust. Secured to and rotatable with the tube 183 is a shaft 185 which carries a gear wheel 186 meshing with and driven by a gear wheel 187 secured to and rotatable with a suitably journaled, horizontal shaft 188, the end of which carries a bevel gear 189 meshing with and driven by a bevel gear 190 secured to and rotatable with the upper end of a suitably journaled vertical shaft 190a. The lower end of the shaft 190a carries a bevel gear 190b which meshes with and is driven by a bevel gear 190c secured to and rotatable with the shaft 39.

When the tube 183 is positioned as shown in Fig. 14, it receives, by way of the pipe 179, a cementitious mixture from the receptacle 165. The quantity of this mixture is measured by the capacity of the tube 183 and this should be sufficient to slightly more than fill a mold M. By the described mechanical arrangement, the tube 183 rotates continuously at slow speed and, as it rotates, the tube slot 183a moves from registering position with the discharge end of the pipe 179 thereby discontinuing passage of the cementitious material thereinto. Eventually, during continued rotation of said tube 183, the slot 183a thereof comes into registering relation with the passage defining the upper end of the spout 180. When this happens, the charge of cementitious material passes to said spout, through the screen 180 and then to the mold M to fill the same. It will be understood that the timing is such that a mold M, which is empty except for the colored paste previously charged thereinto at Stations 2, 3, 4 and 5, arrives and pauses at Station 8. Soon thereafter, the tube 183 moves to such position that the charge of cementitious material carried thereby passes into the spout 180. Prior to the time that the table T partakes of its next step of movement, the contents of the tube 183 has been entirely charged into the mold M.

Accordingly, in view of the foregoing, it will be understood that the molds M arrive in succession at Station 8 where each is filled with a charge of cementitious material. With an arrangement of the character described, the upper surface of the material thus charged into each mold, ordinarily, is not level. Therefore, in accordance with the invention, the material in each mold should be leveled. An operation of this character is performed at Station 9.

Referring to Figs. 1, 16 and 19, the table T is shown as supporting a circular, upstanding cam track 191, the center of which coincides with the center of the table. The track 191 comprises cam grooves 191a which are uniformly spaced in accordance with the spacing of the described stations, one cam groove 191a being positioned opposite each station. At Station 9, a roller 192 engages the upper surface of the cam track 191 and is journaled in a bracket 193 secured to and projecting from an elongated housing 194 which supports the ends of a pair of strip-like members 195 disposed in side-by-side relation. Secured to the end of the housing 194 toward the left, Fig. 16, are the ends of a pair of bars 197 which, at their other ends, are mounted, respectively, on pivot pins 198 carried by suitably mounted supports 199.

Pivoted to the end of each strip-like member 195 toward the left, Fig. 16, is one end of a link 200. The other end of each link 200 is pivoted to one end of an arm 201 secured to and rotatable with a shaft 202 journaled in a suitably supported bearing. Each shaft 202 carries a bevel gear 203 which are disposed in facing relation and mesh with a single bevel gear 204 secured to the upper end of a vertical shaft 205 journaled in a suitably supported bracket 206. The lower end of the shaft 205 carries a bevel gear 207 which meshes with a bevel gear 208 carried by the hereinbefore described shaft 39.

Each strip-like member 195 has suitably secured thereto a transversely extending bar 209. A pair of arcuate bars 210 are secured to each bar 209 and to the associated strip-like member 195.

Just before a form F, which has been filled with cementitious material, arrives at Station 9, the strip-like members 195 and the thereby-carried sets of bars 209, 210, are related thereto as shown in Fig. 16. At this time, the bars 209 are in face-to-face engagement. The roller 192 is in engagement with a high surface of the cam track 191 and, accordingly, the housing 194 and parts carried thereby are elevated as shown in Fig. 17.

Just as a form F arrives and pauses at Station 9, the cam roller 192 drops into a cam groove 191a with the result that, under the influence of gravity, the housing 194 and associated parts move downwardly on the pivot pins 198 and are positioned as shown by the full lines in Fig. 17. As a result, the bars 209 and 210 come to rest upon the upper surface of the stationary form F and, in so doing, dip into such of the cementitious material as is disposed above the upper form surface.

As hereinbefore stated, the shaft 39 rotates constantly at uniform speed. The gear wheel 204 partakes of similar rotative movement and, by virtue of the disclosed arrangement, the gear wheels 203 rotate in opposite, respective directions. The arms 201 are 180 degrees out-of-phase and, therefore, similar out-of-phase movement is imparted to the members 195 to the respective sets of bars 209, 210. The arrangement is such that, when the housing 194 and associated parts drop as described above, the parts are positioned as shown in Fig. 16. Immediately after the action last noted occurs, the members 195 and the respective sets of bars 209, 210 are moved in opposite directions to the respective positions shown in Fig. 18. As a result, the cementitious material in the form F is leveled and any crevices or depressions therein are filled in. In this connection, the action of the arcuate bars 210 is important. These bars "plough" the cementitious material sideways with resultant effective distribution and leveling thereof.

When the parts become positioned as shown in Fig. 18, the cycle of movement is completed. At this time, the cam track 191 lifts the housing 194 and associated parts whereupon another step of movement of the table T is initiated and the form F, with the upper surface of the cementitious material therein now level and smooth, moves onward to Station 10. In this manner and in succession, each filled form arrives at Station 9 where the leveling operation described above is performed.

With the form of the invention herein described, Station 10 is an idle station. Each form F, then, passes to this station, pauses and moves on without performance of an operation thereon.

With the form of the invention herein disclosed, the contents of each form F is subjected to the action of pressure at Station 11. Any suitable source of pressure may thus be employed, for example, as hereinafter described wherein the desired pressure is created by hydraulic action.

Referring to Figs. 2 and 3, the lower surface of the rod 65a of each base plate 65, upon arrival at Station 11, engages the upper surface of an anvil or support 212 secured to and upstanding from the aforesaid base 1. Disposed vertically above the anvil 212 is a ram or plunger 213 having cross-sectional configuration only slightly less than the cross-sectional configuration of the chamber defined by the form when the form members 58 are closed. The ram 213 is carried by a rod 214 secured to the lower end of a piston 215 reciprocatory in a cylinder 216 supported in suitable manner as, for example, by a clamp 217 secured to a tank 218 which, in the example shown, contains liquid under pressure maintained therein in any suitable manner, for example, by weight or air-ballast action. As shown, the ram 213 may be guided for movement in a vertical direction by a suitably supported guide member 213a, Fig. 2.

The piston 215 should be biased in an upward direction and, to this end, there may be utilized a helical spring 219 which is seated in a chamber defined by said piston 215 so as to be effective for the purpose stated. Adjacent the top of the cylinder 216, a pipe 220 communicating with the interior thereof is connected with the interior of a valve body 221 supported in suitable manner, for example, by the aforesaid clamp 217. A second pipe 222 disposed in communicating relation with the interior of the valve body 221 is connected to the interior of the aforesaid tank 218.

A third pipe 223, which also communicates with the interior of the valve 221, leads to the intake side of a suitable pump 224, Fig. 2, the discharge side of which, by a pipe 225, is connected to the interior of the aforesaid tank 218. The pump 224 should be operated continuously, for example, by the hereinbefore described motor 9.

As shown in Figs. 3 and 3a, a conical valve 226 is disposed in the valve body 221 which, in suitable manner, has a cover plate 227 secured thereto. The valve 226 comprises oppositely extending stems 226a and 226b journaled, respectively, in the cover plate 227 and valve body 221. Seated on the valve body 221 is a collar 228 through which the aforesaid stem 226b extends, the latter, adjacent the end thereof, carrying a second collar 229. A helical spring 230 is disposed between these collars and serves to bias the valve 226 into engagement with its seat as defined by the valve body 221. The valve 226 comprises two transversely disposed passages 226c and 226d. Each end of these passages terminates in an elongated passage formed on the periphery of the valve 226.

The aforesaid stem 226a has secured to the outer end thereof a bevel gear 231 which meshes with and is driven by a bevel gear 232 secured to one end of a suitably journaled horizontal shaft 233 having a bevel gear 234 disposed at the other end thereof. The bevel gear 234 meshes with a bevel gear 235 secured to the upper end of a suitably journaled vertical shaft 236 having, at its lower end, a bevel gear 237 which meshes with a bevel gear 238 secured to one end of the hereinbefore described shaft 43, Figs. 1 and 2.

After leaving Station 10, each form F, carrying a lower layer D of the hereinbefore described color paste and an upper filling, leveled charge of the hereinbefore described cementitious material, is moved to and becomes stationary at Station 11. As each form arrives at this station, the ram 213 is in elevated position and, accordingly, each form readily moves into position thereunder.

The hereinbefore described valve 226 rotates constantly at low speed under the influence of power obtained from the constantly driven shaft 43. Just after a filled form F arrives at Station 11, the valve 226 moves to the position illustrated in Fig. 3 and, through the valve passage 226c, causes the hydraulic pressure existing interiorly of the tank 218 to become effective in the cylinder 216 above the ram 213. As a result, said ram 213 is forced downwardly under high pressure into engagement with the surface of the cementitious material in the form F. Resulting from this operation, all of the material in the form is compressed and, in so doing, the entire mass of tile-forming material is permeated, to some extent, with the mixture of the charge of color paste. By this operation, the tile is brought substantially to its completed state. The pressure above the ram 213 continues to be effective until the valve 226 has moved counterclockwise, Fig. 3, to such extent that the valve passage 226c is closed. Thereafter, the pressure remains established above said ram 213 until the valve 226 has rotated in the same direction as noted to such extent that the passage 226d comes into communicating relation with the pipes 220 and 223. When this happens, the pressure of the chamber 216 above the ram 213 is released whereupon the spring 219 elevates said ram 213. Shortly thereafter, the table T is indexed and said last named form F, having a substantially complete tile R therein, is moved to Station 12. In the form of the invention herein disclosed, although not necessarily, the station last named is an idle station. Therefore, no operation is effected at this station and, when the table T is next indexed, said last named form F moves to Station 13.

Referring to Figs. 1, 20, 21 and 21a, the hereinbefore described shaft 48 is shown as carrying a bevel gear 242 with which meshes a bevel bear 243 secured to the lower end of a vertical shaft 244 journaled in a bracket 245 secured to and projecting from the wall 34. The upper end of the shaft 244 carries a bevel gear 246 which meshes with a bevel gear 247 secured to a horizontal stub shaft 248 journaled in a bracket 249 secured to the bracket 245. Secured to and rotatable with the stub shaft 248 is an arm 250 pivoted to one end of a link 251 which, at its other end, is pivoted to a rack bar 252 movable to-and-fro in a channel member 253 fixed to a bracket 254 carried by the aforesaid wall 34.

Adjacent one end, one vertical section of the channel member 253 is apertured as indicated at 253a and this aperture is divided into upper and lower slots by a member 255 secured in position by a plate 256 secured thereto and to the channel member 253, the member 255 terminating short of each end of said aperture 253a. A lever 257 is disposed on the outer side of the channel member 253 and pivoted thereto, this lever being biased in a clockwise direction, Fig. 21, by a suitable anchored spring 258.

At the end of the channel member 253, the other vertical section thereof is provided with an aperture corresponding with the aperture 253a above noted. Otherwise, the second aperture has associated therewith a dividing member and a biased lever corresponding, respectively, with the above noted dividing member 255 and lever 257. These two apertures and the duplicate sets of parts are disposed in transverse alinement.

Adjacent its other end, the vertical sections of the channel member 253 are apertured and provided with duplicate sets of parts corresponding with those described above.

As shown in Figs. 21 and 21a, the rack bar 252 carries two sets of transversely alined rollers 259, the rollers of each set being disposed on opposite respective sides of the rack bar 252. Each roller 259 is adapted to move in the upper and lower slots of each aperture 253a.

During operation of the machine, the rack bar 252 is reciprocated continuously under the influence of power obtained from the constantly rotating shaft 48. As the rack bar moves from right to left, Fig. 21, it passes along a horizontal path. At this time, the rollers 259 are moving in the aforesaid lower aperture slots and, eventually, these rollers 259 engage the respective levers 257 to depress them against the action of the springs 258 until the upper surfaces thereof are horizontal. During continued movement of the rack bar 252 in the direction noted, the rollers 259 move along the respective upper surfaces of the levers 257. Eventually, as said rack bar 252 reaches the end of its movement toward the left, Fig. 20, the effect of the springs 258 overcomes the weight of the rack bar 252 and the thereby-carried parts whereupon the rack bar 252 is swung in a clockwise direction, Fig. 21, about the pivot at the end of link 251. As this happens, the rack bar 252 is starting to move from left to right, Fig. 21, and, accordingly, the rollers 259 move into the aforesaid upper aperture slots. In this tilted position, with the rack bar teeth elevated, the rack bar moves to the end of its stroke toward the right, Fig. 21, whereupon the rollers 259 move downwardly into the lower aperture slots as the rack bar 252 resumes its horizontal position so that it may again start moving toward the left, Fig. 21.

When a form F arrives at Station 13, the two right-angular form members 58 are closed and the gear segments 60 are positioned as shown in Figs. 20 and 21. Just after said form F pauses at Station 13, the rack bar 252 reaches the end of its movement toward the right, Fig. 21, and resumes its horizontal position as noted above. When this happens, the sets of rack bar teeth drop into engagement with the respective gear segments 60. Immediately thereafter, the rack bar 252 starts moving toward the left, Fig. 21, and, in so doing, the gear segments 60 are rotated in a counterclockwise direction, Fig. 21. As a result, the two form members 58 are moved to open position and disengaged from the formed tile. When the rack bar 252 reaches the end of its movement toward the left, Fig. 21, it is tilted as described above with consequent disengagement thereof from the gear segments 60. Thereupon, the table T is indexed and the form F, with its form members 58 open, moves toward Station 14.

Referring to Fig. 4, the base 1 is shown as supporting a segmental member 261 preferably provided on its upper face with anti-friction members, not shown, and having an upwardly inclined end portion 261a terminating closely adjacent Station 13. The member 261, at Station 14, merges into a horizontal portion 261b which extends to Station 15 where it terminates in a downwardly inclined end portion 261c.

Just after the table T is indexed to cause the opened form F to pass beyond Station 13, the lower end of the rod 65a engages the inclined end portion 261a of the member 261. As a result, the rod 65a and the base plate 65 are moved upwardly carrying the tile therewith between the opened form members 58. When the form F pauses at Station 14, the base plate 65 is in its fully elevated position as shown in Fig. 31. As a result, the tile is supported in elevated position at Station 14 where it is removed from said base plate 65 by mechanism now to be described.

Referring particularly to Figs. 25 and 26, the hereinbefore described wall 34 is shown as having secured thereto a bracket 262 having a vertical passage in which is journaled a shaft 263 to the lower end of which is secured a bevel gear 264 which meshes with and is driven by a bevel gear 265 secured to and rotatable with the aforesaid shaft 44.

The shaft 263 has secured thereto a sleeve having formed integrally therewith lower and upper members 266 and 267 forming part of a Geneva movement. The lower member 266 is symmetrically disposed on opposite respective sides of the shaft 263 and terminates in the oppositely disposed arcuate surfaces 266a. Similarly, the upper member 267 is symmetrically disposed on opposite respective sides of said shaft 263 and each end thereof carries a depending roller 268.

Secured to the above noted wall 34 is another bracket 269 having a vertical passage in which is seated the lower end of a vertical member 270, any suitable means, not shown, being utilized for securing the lower end of the member 270 to the bracket 269. Disposed concentrically with respect to the fixed member 270 is a vertical, tubular shaft 271 supported, at its lower end, by an anti-friction bearing 272 which rests upon the bracket 269. Secured to the upper end of the tubular shaft 271 is the hub of a rotatable support 273 which, by an anti-friction bearing 274, is connected to the aforesaid fixed member 270. The lower surface of the rotatable support 273 engages the rotatable element of an anti-friction bearing 275, the stationary element of which is secured to a fixed table 276 having its hub threaded to a fixed sleeve 277 concentrically disposed with respect to the tubular shaft 271. A collar 278 rests upon the upper surface of the aforesaid bracket 262 and is secured to the fixed sleeve 277 by one or more set screws 279. In this manner, the fixed sleeve 277 is prevented from moving downwardly under the influence of the weight imposed thereon. One or more set screws 280, threaded through the wall of the bracket 262, engage the fixed sleeve 277 to positively prevent rotative movement thereof.

The aforesaid fixed member 270 and tubular shaft 271 extend vertically through a central passage provided in a disk 281 forming another part of the Geneva movement last referred to, said disk 281 being suitably secured to the tubular shaft 271 for rotatable movement therewith as a unit. As shown, the disk 281 has four radial grooves 281a formed on the upper surface thereof. These grooves are spaced in right-angular relation with respect to each other and, between each set of grooves, the disk 281 is shaped arcuately as indicated at 281b.

In view of the foregoing description, it will be understood that rotary movement of the shaft 44 is transmitted to the aforesaid upper member 267 of the Geneva movement to rotate the same in a clockwise direction, Fig. 26. The rollers 268 of the member 267 successively coact with the surfaces defining the respective grooves 281a of the disk 281 to impart step-by-step rotative movement of the latter in a counter-clockwise direction, Fig. 26. The tubular shaft 271 rotates with the disk 281 and, therefore, the described movement of the latter is transmitted to the support 273 to effect step-by-step rotative movement thereof. It will be understood that an arcuate surface 281b of the member 281 coacts with an arcuate surface 266a of the member 266 during each stationary period of the latter. In this known manner, the disk 281 is anchored against undesired movement at those times when no power is being transmitted thereto by the member 266.

The above noted fixed table 276, adjacent the periphery thereof, has secured thereto a cylindrical cam track 282 disposed in vertical relation with respect to the horizontal surface of said table 276. The upper surface 283 of the cam track 282 serves as a cam in the manner hereinafter described.

The above noted support 273 which, as stated, rotates step-by-step, carries four pairs or sets of spaced vertical guide members 284 which are spaced, as regards the center of said support 273, in right-angle relation.

Slidably related to each set of the guide members 284 is a carriage 285, the depending end of each carriage being bifurcated for the free reception of the aforesaid cam track 282. Above this bifurcated portion, each carriage 285 has secured thereto a transverse pin on which a roller 287 is journaled. The rollers 287 of the respective carriages 285 coact with the upper cam surface 283 of the cam track 282. The upper portion of each carriage 285 is shaped to form a vertical, central well 288. The lower end of a helical spring 289 is seated in each well 288 and the upper end of each spring 289 engages a ring 290 which, by screws 291, is fixed with respect to the carriages 285.

Each carriage 285 is shaped to form a horizontal passage having secured therein a horizontal sleeve 292 which, in suitable manner, is mounted for rotatable movement only. Suitably secured to the inner end of each sleeve is an angular arm 293 which carries transversely supported rollers 294 and 295 adjacent the ends of the respective arms, these rollers being utilizable as hereinafter described.

Suitably secured to the end of each sleeve 292 is a housing 296, Fig. 27, having alined tubular portions related angularly thereto. Each tubular portion has secured thereto a fixed sleeve 297, these sleeves being alined with each other. Slidable in each sleeve is a plunger 298 and the outer end of each plunger has a pair of right-angularly related tile-gripping members 299 secured thereto, each member 299 having an inner pad 300 of felt or the like suitably secured thereto. Each plunger 298 has an inner head 298a and, cooperative with each head 298a, is a spring 301. These springs 301 bias the respective plungers 298 toward each other whereby the sets of tile-gripping members 299 are urged toward each other.

As shown in Fig. 25, each sleeve 292 may carry a collar 302 which anchors in position a housing 303 through which the associated sleeve extends. A spring 304 disposed with the housing 303 engages one or more washers 305 to apply friction resisting turning movement of the sleeve 292 to some extent.

Each sleeve 292 has slidable therein a rod 306 which is guided for longitudinal movement by tubular supports 307 carried interiorly of said sleeve 292. At its outer end, Fig. 27, each rod 306 carries a cam head 308 having cam faces 308a engaged, respectively, by the inner heads 298a of the aforesaid plungers 298. At its inner end, each rod 306 carries a cam follower 309 coactable with the cam surface 310 of a fixed cam 311. By a suitable spring 312, each rod 306 is biased inwardly or in such direction that the cam follower 309 thereof tends to move toward the cam surface 310.

The hereinbefore described fixed member 270 extends above the movable support 273 and the upper end portion thereof has the aforesaid cam 311 secured thereto. The fixed cam 311 has a cover plate 314 suitably secured thereto, as by screws 315. A circular casing 316 cooperates with the cover plate 314 and the aforesaid fixed table 276 to form a housing for the described mechanism.

The cam 311 has a cylindrical cam track 317 suitably secured thereto, Fig. 25. The cover plate 314 has a corresponding cylindrical cam track 318 secured thereto, Fig. 23. These two cam tracks 317 and 318 cooperate to form a cam groove 319 for the reception of the hereinbefore described rollers 294. A slot 320, Fig. 27, extends horizontally through the cam tracks 317 and 318 for the reception of the members 321 which connect the respective cam followers 309 to the rods 306. Connecting members 322 connect parts of the aforesaid cam tracks 317 and 318 in assembled relation.

In view of the foregoing description relating to Figs. 23 and 25, it will be understood that the described mechanism includes one set of fixed parts and another set of movable parts. The set of fixed parts consists principally of the fixed sleeve 277, the table 276, the cylindrical cam track 282, the fixed member 270, the cam 311, the cover plate 314 and the parts secured to said cam and cover plate. The set of movable parts consists of the tubular shaft 271, the rotatable support 273, the standards 284 and the carriages 285 together with all of the parts carried thereby. This set of movable parts will be hereinafter generically termed the "turret."

As will be understood, the Geneva movement illustrated in Figs. 25 and 26 operates to impart step-by-step movement to the aforesaid turret. The gear ratio between the gear wheels 265 and 264 is 2:1 and a similar ratio obtains in the Geneva movement. Therefore, the turret moves through an angle of 90 degrees for each step of movement of the table T. The timing is such that the turret moves as the table moves and remains stationary as the table remains stationary.

As hereinbefore stated, the table T moves the form F to Station 14 with the form members 58 open and with the base plate 65 holding the compressed tile R in elevated position. As the table thus moves, the turret moves in a counter-clockwise direction, Fig. 1, and, as movement of the table ceases, movement of the turret likewise ceases. The timing and arrangement of parts is such that, as the aforesaid joint movement ceases, the turret sleeves 292 are positioned as shown in Fig. 1. Thus, one of the sleeves 292 is positioned above Station 14 and, as regards this sleeve, the parts carried thereby are related to each other and to the tile R as shown in Fig. 27. Further, the gripping members 299 are in substantially a horizontal plane above the horizontal plane of the tile R which is supported on the elevated base plate 65.

Just as the aforesaid joint movement of the table and turret ceases, two operations are effected substantially simultaneously as follows: (1) A roller 287 is secured to that carriage 285 carrying the aforesaid turret sleeve 292 which is positioned above Station 14, Fig. 1. This roller 287 coacts with the surface 283 of fixed cam track 282 and said roller 287 moves into the low area defined by the surface 283 just as the aforesaid joint movement ceases. As a result, the last named carriage 285 and turret sleeve 292 (just as they cease moving rotatably) are lowered until the horizontal plane of the gripping members 299 coincides with the horizontal plane of the tile R. (2) The rod 306 carried by said last named turret sleeve 292 has connected to the inner end thereof a member 321. A cam follower 309 is carried by the member 321 and this cam follower 309 coacts with the cam surface 310 of fixed cam 311. The cam follower 309 moves into the low area of cam surface 310 just as the aforesaid joint movement ceases. As a result, the rod 306 is moved from right to left, Fig. 27, whereupon the springs 301 move the respective tile-gripping members 299 into engagement with opposite diagonal corners of the tile R.

The described parts remain positioned in the manner referred to above until the next step of indexing movement is imparted to the table T and until the first step of indexing movement is simultaneously imparted to the turret. When this happens, rotative movement of the turret occurs in a counter-clockwise direction whereas the table T moves in a clockwise direction, Fig. 1. In response to this joint movement, the tile R is moved arcuately by the tile-gripping members 299 which, initially, remain substantially in the horizontal plane noted above. As hereinafter described, the upper surface of each base plate 65, at one stage of the operation, has a coating of oil, or equivalent, applied thereto. Accordingly, as the elevated base plate 65 recedes from Station 14, the tile R readily moves therefrom by a sliding action, Fig. 5a, and, eventually, is supported solely by the tile-gripping members 299 which move to and become stationary (at the conclusion of the first step of turret-indexing movement) at a position removed in a counter-clockwise direction 90 degrees from Station 14, Fig. 1.

At the proper time during this first step of turret-indexing movement, the carriage 285 may be returned to the original elevated position thereof described above. To this end, as shown in Fig. 24, the cam roller 287 engages a sloping surface of the cam track 282 and is elevated thereby to move the last named carriage 285 upwardly and return the tile-gripping members 299 to substantially the same horizontal plane which they occupied when the operation was initiated above Station 14. This elevating operation may be performed just prior to the time that the tile R is removed from the base plate 65 or it may be done at any other suitable time during movement of the turret.

The cam followers 294 coact with the cam groove 319 between the fixed cam tracks 317, 318 to effect rotatable movement of the respective turret sleeves 292 about their own longitudinal axes. In the form of the invention herein disclosed, although not necessarily, the cam follower 294, which is associated with the turret sleeve 292 under consideration, moves through a substantially inactive portion of the cam groove 319, Fig. 29, while the tile-gripping members 299 and the thereby-carried tile R are moving arcuately to the position last described.

During the second step of turret-indexing movement, the tile-gripping members 299 and the thereby-carried tile R move to and become stationary at a position removed in a counter-clockwise direction 180 degrees from Station 14, Fig. 1. During this period, the cam follower 294 last named moves through an active portion of the cam groove 319, Fig. 29, and, as a result, the tile-gripping member 299 and the thereby-carried tile R are moved from a horizontal plane to a vertical plane, Fig. 1, during the second step of turret-indexing movement. Just before the tile-gripping members 299 reach the position last described, the rod 306, by action of the fixed cam 311, Fig. 23, is returned to the position thereof shown in Fig. 27. As a result, the tile-gripping members 299 are opened. As this happens, an attendant should manually grasp the tile R and remove the same from said members 299.

During the third step of turret-indexing movement, the empty tile-gripping members 299 move to and become stationary at a position removed in a counter-clockwise direction 270 degrees from Station 14, Fig. 1. During this period, the cam follower 294 last named moves through a portion of the cam groove 319 which is active in a sense the reverse of that described above, Fig. 29. Accordingly, the empty tile-gripping members 299 are returned to a horizontal plane.

During the fourth step of turret-indexing movement, the cam follower 294 last named moves through a portion of the cam groove 319 which is substantially inactive. Accordingly, the empty tile-gripping members 299 return to the position which they occupy as first described above Station 14 whereupon a succeeding series of operations are performed step-by-step in the manner described.

In a detailed manner, I have described a complete chain of operations for one group of turret elements. The turret comprises three other groups of such elements and all groups are duplicates. Each group is automatically operable step-by-step in the detailed manner described above and, in this connection, the described fixed cams operate sequentially to perform the various operations referred to above.

After the compressed tile R has been removed from the elevated base plate 65 as described above, the form F, the members 58 remaining open and the base plate 65 remaining elevated, moves to Station 15 for operations performed thereon by mechanism now to be described.

Referring particularly to Figs. 30 and 31, the hereinbefore described shaft 44 is shown as having secured thereto a gear wheel 320 which meshes with and drives a gear wheel 321 secured to the lower end of a vertical shaft 322 journaled in a bracket 323 secured to the hereinbefore described wall 34. Secured in upper portions 323a of the bracket 323 are the respective alined axles 324, one of which has rotatable thereon a bevel gear 325 which meshes with a bevel gear 326 secured to the upper end of the aforesaid shaft 322. Adjacent ends of the axles have rotatable thereon the respective hubs of arms 327 to the outer ends of each of which one end of a link 328 is pivoted.

A pair of parallel channel members 329 open at the ends thereof toward the left, Fig. 30, and having the channels thereof facing each other are secured to the respective bracket portions 323a, these channel members extending horizontally at opposite respective sides of Station 15. Each channel member 329, within the channel thereof and midway between the upper and lower surfaces thereof, has secured thereto a horizontal track 330 which, at the end thereof toward the left, Fig. 31, comprises a pivoted section 330a terminating immediately adjacent a lower inclined track section 331 which merges into an upper horizontal track section 331a. As shown in Fig. 32, the horizontal track 330, intermediate its ends, comprises a second pivoted section 330b biased to horizontal position by a spring 330c. Further, a section of the track 330 is inclined upwardly as indicated at 330d so as to form a gap therein. These track and track sections of the respective channel members 329 are duplicates and they are positioned, respectively, in facing relation at the same horizontal levels. Transversely disposed between the channel members 329 is a housing 332 having secured to the rear surface thereof angle members 333 which are disposed closely adjacent the respective channel members 329. Each angle member 333 carries forward and rear rollers 334 and 335 adapted, in the manner hereinafter described, to travel to-and-fro in the respective channels of said channel members 329.

A pair of upper engaging rollers 336 and a lower intermediate roller 337 engaged thereby are journaled horizontally in the housing 332, the rollers 336 being disposed at the same level. Disposed on the housing 332 and carried thereby is a valve-controlled tank 338 containing oil or similar liquid and comprising a discharge orifice through which the liquid is discharged so as to form a pool thereof between the rollers 336.

Secured to the front surface of the housing 332 is a bracket 339 forming a support for a felt strip 340 or the like. This felt strip extends throughout the length of the housing 339 and the lower surface thereof is disposed substantially at the same level as the lower surface of the roller 337.

During the operation of the machine, the housing 332 is reciprocated continuously along the channel members 329 under the influence of power obtained from the constantly rotating shaft 44. As the housing 332 moves from right to left, Fig. 31, it passes along a horizontal path and, at this time, the respective sets of rollers 334, 335 move along the lower surfaces of the channel members 329. Eventually, the housing 332 moves beyond the channel members 329 and the respective forward rollers 334 come into engagement with the pivoted track sections 330a with consequent elevation thereof. Continued movement of the respective forward rollers 334 toward the left, Fig. 31, causes them to be elevated still further upon the horizontal track sections 331a. This happens as the housing 332 reaches the end of its stroke toward the left, Fig. 31. When the forward rollers 334 are thus elevated, the housing 332 and all parts carried thereby including the roller 337 and felt strip 340 are tilted upwardly.

Thereupon, the direction of movement of the housing 332 is reversed and, during such reverse movement, the forward rolers 334 ride along the respective track sections 331a, 330a and the respective tracks 330. The rear rollers 335, however and at all times, ride along the respective lower surfaces of the channel members 329. During such reverse movement, the housing 332 and parts carried thereby remain tilted upwardly as described above. Eventually, as the housing 332 nears the end of its stroke toward the right, Figs. 31 and 32, the advanced rollers 334 engage and depress the respective track sections 330b. As a result, the respective rollers last named move downwardly into engagement with the lower horizontal surfaces of the channel members 329 whereupon the housing 332 and all parts carried thereby return to the original horizontal or non-tilted position. Under the influence of the springs 330c, the respective track sections 330b are elevated to horizontal position as soon as the rollers 334 recede therefrom. The parts are now restored to normal position and, accordingly, are in condition to again move from right to left, Fig. 31.

Soon after the form F pauses at Station 15, the housing 332, while moving from right to left, Fig. 31, causes the felt strip 340 to move in the same direction so that it engages and cleans the upper surface of the elevated base plate 65. The roller 337, following the felt strip 340, engages said base plate surface and applies a film of oil thereto. As the parts reach the end of their stroke toward the left, Fig. 31, the housing 332 and the parts carried thereby including the felt strip 340 and roller 337 are tilted upwardly in the manner described. Therefore, on the return stroke of the housing 332, engagement of the felt strip 340 and the roller 337 does not occur. As the housing 332 resumes its position at the right, Fig. 31, the next step of indexing movement of the table T occurs and, accordingly, the form F starts moving toward Station 1.

During the operations described above, the form F was stationary at Station 15. While thus positioned, the form members 58 are open and the base plate 65 is elevated. As soon as the table T has the next step of movement imparted thereto, the depending rod 65a of the base plate 65 engages the downwardly inclined section 261c, Fig. 4, of the member 261 and then passes therebeyond. As a result, the base plate 65, under the influence of gravity is lowered immediately to its normal, operative position. The form members 58, however, remain open at this time.

Figure 34:
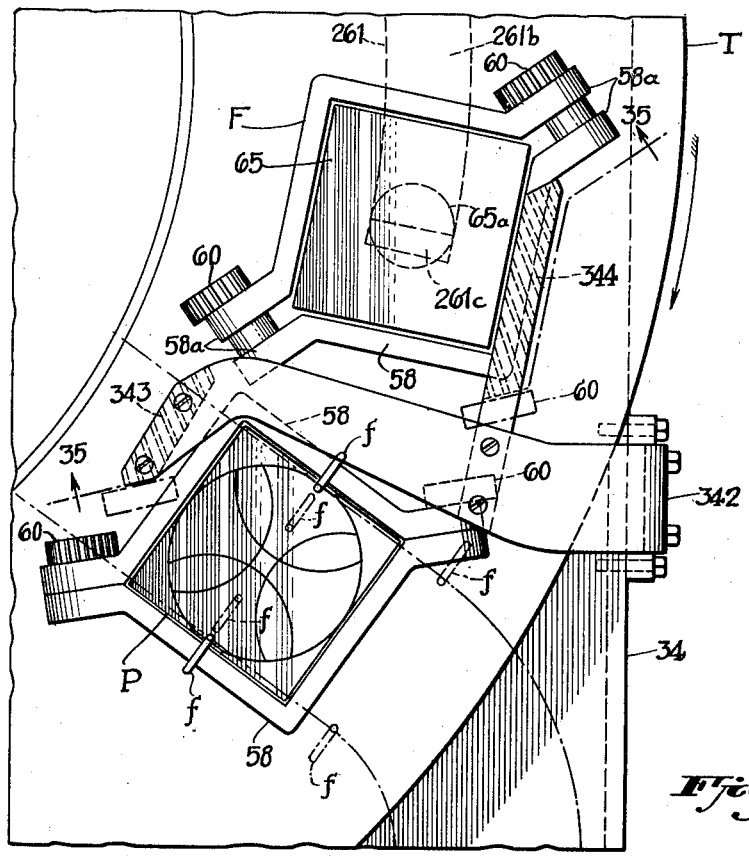
Fig. 34 is a plan view illustrating a mold opening mechanism.
Figure 35:
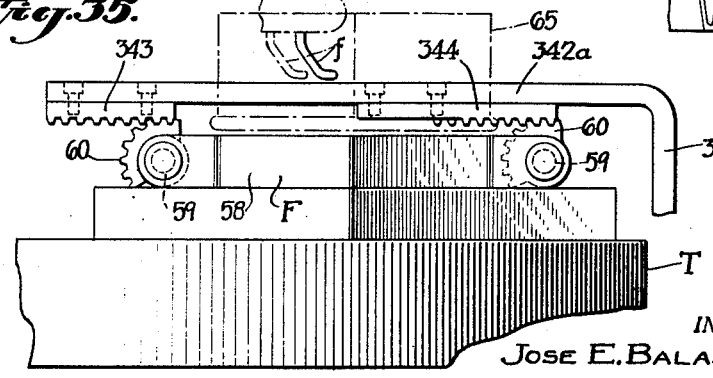
Fig. 35 is a vertical sectional view, partly in elevation, taken on the line 35—35 of Fig. 34 looking in the direction of the arrows.

Referring to Figs. 1, 34 and 35, an angle member 342 is shown as secured to the aforesaid wall 34. This angle member comprises a horizontal section 342a positioned between Station 15 and Station 1. This horizontal section 343a of member 342 carries a pair of rack bars 343 and 344 which, likewise, are positioned between the stations last named. The teeth of the rack bars 343 and 344 face downwardly and they are positioned at the proper level in the path taken by the respective gear segments 60 of the form F as the latter travels from Station 15 to Station 1. Therefore, as the gear segments 60 partake of the movement last described, they come into coacting relation with the respective sets of downwardly facing teeth of the fixed rack bars 343 and 344. As a result, the gear segments 60 are rotated in a clockwise direction, Fig. 35, to return the two form members 58 to their closed, operative position.

Figure 36:
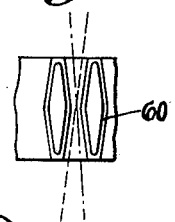
Fig. 36 is an enlarged plan view illustrating a detailed feature of the mechanism shown in Fig. 34.

In connection with the foregoing, it will be noted that the teeth on the gear segments 60, Figs. 34 and 35, are ordinary gear teeth disposed parallel with their respective axes of rotation. However, they should be rounded at their ends. When the gear teeth of the gear segments are of this character, the teeth on the respective rack bars 343, 344 should be of the radial type as indicated particularly in Fig. 34. In case the teeth on the rack bars last named are of the ordinary type (with rounded ends), the teeth of the gear segment 60 should be shaped as indicated at Fig. 36 wherein each gear tooth has oppositely disposed, symmetrical sections converging from the center thereof.

In the preceding part of this description, it was stated that the base plate 65 moves upwardly after it leaves Station 13 and then returns to its lower position immediately after leaving Station 15. As shown in Fig. 31a, the base plate 65 has a brush 66 secured thereto. During upward and downward movement of said base plate 65 in the manner referred to, the brush 66 engages the interior surfaces of the form members 58 to thereby remove any material which has adhered thereto as a result of the molding operation.

The path of a form or mold F has now been followed from Station 1 to all of the other stations in succession. When the two form members 58 were closed as described immediately above, a cycle of operation for a single form was completed and the form is in condition to start another cycle of operation. Thus, after said form members 58 are closed, the form F continues moving until it arrives and pauses at Station 1 where another pattern P may be deposited therein in the manner hereinbefore described.

As regards the disclosed machine, the table T carries fifteen duplicate forms F. Each time that the table pauses, operations are performed at the respective stations, except at the idle stations, which are the same as previously described herein. As regards a single form F, then, the various operations are performed automatically in rapid sequence. Since, as stated, the table T carries a large number of the forms, it becomes apparent that a single machine constructed in accordance with my invention has a large tile output.

In the preceding part of this specification, I have described an embodiment of the invention which functions in the intended manner for the production of tiles in response to operations automatically effected. It will be obvious, however, to those skilled in the art that substantially all of the operations, may be performed by mechanisms differing substantially from those herein described and illustrated.

Thus, it is a feature of the invention that a conveyor consisting of the plates 79, sprocket chain 83 and associated parts carries the patterns P for disposal in and removal from the respective forms F. In the form of the invention herein described, the aforesaid conveyor operates continuously and is synchronized with movement of the table T. Under some circumstances, it may be desirable for step-by-step movement to be imparted to this conveyor, this movement to be synchronized with the step-by-step movement of the form-carrying table. Obviously, other equivalent forms of conveyors may be utilized in lieu of the one described, for supporting the patterns P.

The invention has been described with respect to a machine having four tanks 120 which contain pastes having different colors, respectively. Obviously, the invention is not to be so limited. In suitable manner, a plurality or all of the differently colored pastes may be disposed in the respective pattern chambers at a less number of stations or even at a single station.

It was previously stated that the tiles to be produced may have selected size and configuration as desired. To this end, the molds or forms may have such size, configuration or contour as desired. The same holds true for the patterns to be associated therewith. In no manner at all is the invention to be limited to a square form and a square pattern. It will be understood that the chambers defined by the patterns for receiving colored material may have size and arrangement as desirable. Further, it is to be understood that the upper surface of the base plates 65 may be plane or provided, as desired, with corrugations, indentations or the like in order to form desired patterns.

In the disclosed machine, a number of idle stations are provided. This is without significance since these stations were included in the disclosed machine primarily for convenience from the design viewpoint. Idle stations may be omitted and the number of stations may be chosen as desired.

As herein disclosed, some of the operations are performed directly at the respective stations and others between stations. The invention is not to be restricted in this respect. Obviously, it is immaterial whether or not such operations as opening and closing of the form members, vibration of the color paste, etc, are performed while the table, or equivalent, is stationary or moving.

The indexing movements may be obtained by mechanisms different from those disclosed. Variable speed features may be introduced. The patterns P and surfaces of the molds may be cleaned in other equivalent ways as will be obvious to those skilled in the art. A fully automatic machine has been disclosed and it is desirable for the machine to be of this character. Yet, under some circumstances, it may be desirable for certain automatic features to be retained while introducing one or more manual operations.

While the invention has been illustrated and described in connection with a horizontal table T which serves as a conveyor for the molds or forms F, it shall be understood that the invention is not to be thus limited. As well, said molds or forms F may be supported by other forms of conveyors which need not necessarily be movable in a horizontal plane. With any type of conveyor for the molds, it is important, however, that the molds be moved step-by-step to the various stations or positions in order that the necessary operations incident to tile production may be performed in generally the manner and sequence hereinbefore described.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent, is:

1. In combination, a conveyor, a plurality of spaced tile-forming molds carried thereby, each mold supporting a compressed tile in readily removable relation, means for imparting step-by-step movement to the conveyor to successively move the molds to a tile-removing position, tile-removing means at said position and comprising a plurality of uniformly spaced tile-gripping devices, and means timed with the conveyor for imparting step-by-step movement to the tile-removing means to cause said tile-gripping devices to successively remove tiles from the respective molds.

2. In combination, a conveyor, a plurality of spaced tile-forming molds carried thereby, each mold supporting a compressed tile in horizontal, readily removable relation, means for imparting step-by-step movement to the conveyor to successively move the molds to a tile-removing position, tile-removing means at said position and comprising a plurality of uniformly spaced tile-gripping devices, means timed with the conveyor for imparting step-by-step movement to the tile-removing means to cause said tile-gripping devices to successively remove tiles from the respective molds while maintaining them substantially in a horizontal plane, and means for subsequently rotating each tile-gripping device and the tile carried thereby until they are positioned substantially in a vertical plane.

3. In combination, a conveyor, a plurality of spaced tile-forming molds carried thereby each mold being formed from a vertically movable base plate and a pair of horizontally movable mold members each of which has right-angular configuration, means for imparting step-by-step movement to the conveyor to successively move the molds to a tile-removing position, means effective on each mold, prior to arrival thereof at said position, for opening said mold members and elevating said base plate together with the thereby-carried compressed tile, tile-removing means at said position and comprising a plurality of uniformly spaced tile-gripping devices, and means timed with the conveyor for imparting step-by-step movement to the tile-removing means to cause said tile-gripping devices to successively remove tiles from the respective elevated base plates.

4. In combination, a first conveyor, a plurality of spaced tile-forming molds carried thereby, a second conveyor, a plurality of spaced supports carried thereby, each of said supports being adapted to detachably carry a pattern, means for operating said conveyors in timed relation, and means for depositing the patterns in the respective molds.

5. In combination, a first conveyor movable step-by-step, a plurality of spaced tile-forming molds carried thereby, a second conveyor movable continuously, a plurality of spaced supports carried thereby, each of said supports being adapted to detachably carry a pattern, means for operating said conveyors in timed relation, and means for depositing the patterns in the respective molds.

6. In combination, a first conveyor, a plurality of spaced tile-forming molds carried thereby, a second conveyor, a plurality of spaced supports carried thereby, each of said supports being adapted to detachably carry a pattern, means for operating said conveyors in timed relation, means for depositing the patterns in the respective molds, means for passing coloring material into a set of chambers defined by each pattern, and means for thereafter removing each pattern from its mold.

7. In combination, a first conveyor, a plurality of spaced tile-forming molds carried thereby, a second conveyor, a plurality of spaced supports carried thereby, each of said supports being adapted to detachably carry a pattern, means for operating said conveyors in timed relation, means for depositing the patterns in the respective molds, means for passing coloring material into a set of chambers defined by each pattern, means for vibrating each mold and the pattern associated therewith to thereby level the therein-contained coloring material, and means for thereafter removing each pattern from its mold.

8. In combination, a first conveyor, a plurality of spaced tile-forming molds carried thereby, a second conveyor, a plurality of spaced supports carried thereby, each of said supports being adapted to carry a pattern, means for operating said conveyors in timed relation, means for depositing the patterns in the respective molds, means for passing coloring material into a set of chambers defined by each pattern, means for thereafter removing each pattern from its mold, and means for thereafter cleaning each pattern.

9. In combination, a first conveyor movable along a closed path, a plurality of spaced tile-forming molds carried thereby, a second conveyor movable along a closed path, a plurality of spaced supports carried thereby, each of said supports being adapted to carry a pattern, means for operating said conveyors in timed relation, means for depositing the patterns in the respective molds, means for passing coloring material into a set of chambers defined by each pattern, means for thereafter removing each pattern from its mold, and means included in the closed path of said second conveyor for thereafter cleaning each pattern.

10. In combination, a first conveyor, a plurality of spaced tile-forming molds carried thereby, a second conveyor, a plurality of supports carried thereby, each of said supports being adapted to detachably carry a pattern, means for operating said conveyors in timed relation, means for depositing the patterns in the respective molds, means for passing coloring material in to a set of chambers defined by each pattern, means for thereafter removing each pattern from its mold, means for depositing a charge of cementitious material in each mold, means for leveling each charge of cementitious material, means for applying pressure to each leveled charge of cementitious material, means for opening each mold, means for removing the compressed tile from each mold, and means for closing each mold.

11. The combination of claim 10 in which the depositing means, the pressure applying means and removing means operate in timed relation with said first conveyor.

12. A molding machine comprising a table, mechanism for imparting step-by-step movement to said table, a plurality of molds uniformly spaced around said table concentrically with respect to the axis of rotation thereof, each mold being constructed and arranged to move from closed position to open position and vice versa, a conveyor cooperative with said table, a plurality of spaced supports carried by said conveyor, each of said supports being adapted to detachably carry a pattern, mechanism for depositing a pattern in a closed mold while the table is stationary in one position, means for passing coloring material into chambers defined by said pattern while the table is stationary in another position, a device for vibrating the closed mold and the pattern disposed therein, mechanism for removing the pattern from the closed mold while the table is stationary in another position, means for filling the closed mold with cementitious material while the table is stationary in another position, a device for leveling the cementitious material in said mold, means for compressing the material in said mold while the table is stationary in another position, a device for opening the mold, means for removing the compressed tile from the mold while the table is stationary in another position, a device for cleaning the mold and applying a liquid film to a surface thereof, and a device for closing the mold.

13. The molding machine of claim 12 wherein all of said means are operated in timed relation with the mechanism for imparting step-by-step movement to said table.

14. The molding machine of claim 12 where all of said means are operated in timed relation with the mechanism for imparting step-by-step movement to said table and wherein said conveyor moves along a closed path having pattern-cleaning means included therein.

15. In combination, a conveyor, a plurality of spaced tile-forming molds carried thereby, each mold being formed of a vertically movable base plate and a pair of horizontally movable mold members each of which has a right angular configuration, means for imparting step-by-step movement to the conveyor to move the molds successively to a tile-removing position, means for opening said mold prior to arrival in said position, means for elevating said base plate, the latter carrying a tile, tile-removing means at said position comprising a plurality of pairs of tile-gripping jaws, means timed with the conveyor for imparting step-by-step movement to the tile-removing means, means for actuating said jaws in response to movement thereof to a tile-removing position whereby a tile is removed from the mold, brush means upon said base plate for cleaning said horizontally movable mold members in response to a change in elevation of said base plate, and means operable after the removal of said tile for scraping and simultaneously applying a lubricant to said plate.

16. In combination, a conveyor, a plurality of spaced tile-forming molds carried thereby, each mold including a vertically movable base plate and a pair of horizontally movable mold members, means for imparting step-by-step movement to the conveyor to move the molds successively to a tile-removing station and thereafter to a mold cleaning and lubricating station, means for opening said mold and elevating said base plate prior to arrival in said tile-removing station, tile-removing means effective on reaching said removing station, a brush mounted on said base plate for cleaning said horizontally movable mold members in response to change in elevation of said base plate, and means operable in response to arrival of said mold in said cleaning and lubricating station for scraping and applying a lubricant to said base plate.

17. In combination, a conveyor, a plurality of spaced tile-forming molds carried thereby, each mold including a vertically movable base plate and a pair of horizontally movable mold members, means for imparting step-by-step movement to the conveyor to move the molds successively to a cleaning and lubricating station, means for elevating said base plate prior to arrival thereof in said position, means on said base plate for scraping and cleaning said movable mold members in response to the elevating of said plate, and means responsive to movement of said mold into said station for scraping same and applying a lubricant thereto.

18. A molding machine comprising a conveyor, means for imparting step-by-step movement to said conveyor, a plurality of molds uniformly spaced upon said conveyor, each mold being constructed and arranged to move from a closed condition to an open condition and vice versa, a second conveyor operatively associated with said first conveyor, means for detachably supporting upon said second conveyor a plurality of spaced patterns, means for moving said first and second conveyors in synchronized relationship, means for depositing a pattern from the second conveyor into a closed mold while the first conveyor is in a first position, means for introducing coloring matter into chambers defined by said pattern while the first conveyor is in a second position, means for vibrating thereafter a mold having a pattern therein, means for removing thereafter the pattern from the mold while said first conveyor is stationary in a third position, means for filling the closed mold with cementitious material while the first conveyor is stationary in a fourth position, means for leveling said material in said mold when said first conveyor is in a fifth position, means for compressing said material and matter in said mold while said conveyor is in a sixth position, means for opening said mold thereafter, means for removing the compressed contents of the mold while the table is stationary in a seventh position, means for cleaning said mold and applying a lubricant film thereto, and means for closing said mold.

19. In apparatus of the class described, a first conveyor, a plurality of molds uniformly spaced upon said first conveyor, a second conveyor mounted for movement adjacent said first conveyor and operatively connected thereto, a plurality of means for supporting a plurality of pattern members upon said second conveyor, a like plurality of pattern members mounted upon corresponding of said supporting means, means for depositing one of said patterns into each of said molds as the latter move adjacent the former, means for passing coloring material thereafter into chambers defined by said pattern, means for removing a pattern from each mold after said coloring material has been introduced therein, means for filling thereafter each mold with a cementitious material, means for compressing said material thereafter, means for removing thereafter said compressed material from each mold, and means for cleaning and lubricating each mold thereafter.

20. A molding machine comprising a first conveyor, a plurality of molds uniformly spaced upon said first conveyor, a second conveyor cooperative with the first conveyor and movable adjacent thereto, a plurality of spaced supports carried by said second conveyor, each of said supports being adapted for detachably carrying a pattern, means for depositing a pattern in a mold while the first conveyor is in one position, means for introducing coloring material into chambers defined by said pattern while said first conveyor is in another position, means for removing the pattern from the mold while said first conveyor is in another position, means for filling the mold with cementitious material while said first conveyor is in another position, means for leveling the cementitious material in said mold, means for compressing said material in said mold when said first conveyor is in another position, means for removing the compressed material from the mold while said first conveyor is in another position, and means for cleaning the mold.

21. In apparatus of the class described, a conveyor, a plurality of molds spaced upon said conveyor, a plurality of pattern members, means for introducing a pattern member in each of said molds in succession, means for introducing cementitious material into chambers defined by said patterns, said material being introduced successively into each of said molds, means for removing successively thereafter each pattern from its respective mold, means for compressing successively said material in each of said molds, and means for removing the compressed material from each of said molds successively.

22. In combination, a first conveyor, a plurality of spaced tile-forming molds carried thereby, a second conveyor, a plurality of spaced supports carried thereby, each of said supports being constructed and arranged detachably to carry a pattern having a set of chambers, said second conveyor being mounted for movement of portions thereof to a position above said first conveyor, means for operating said conveyors in timed relationship, a pattern support actuator operable in response to movement of each pattern support to a preselected position above the first conveyor for releasing the respective pattern held thereby and depositing same in a respective mold, means operable after each pattern has been deposited in its respective mold for passing tile-forming material into the set of chambers defined by said pattern, movement of said first conveyor carrying the pattern containing molds successively to a vibrating station of preselected length, a vibrator for vibrating each mold in succession during movement thereof throughout the length of the vibrating station, and pattern extractor mechanism operatively associated with said pattern supports for moving said supports for reengaging and removing the patterns successively from their respective molds.

23. In apparatus of the class described the combination including, a first conveyor, a plurality of tile-forming molds mounted in spaced relation upon said conveyor, a second conveyor mounted for movement with at least a portion thereof above said first conveyor, a plurality of pattern support devices mounted in spaced relation upon said second conveyor, each of said devices being constructed and arranged detachably to carry a pattern, means for operating said conveyors to move in timed relationship whereby at a preselected station said pattern support devices are successively moved to a position above said molds for the release of a pattern into each mold, said molds being moved successively beneath said support devices, and at another preselected station the pattern support devices again being moved above the pattern containing molds moved successively therebeneath for the extracting of each pattern successively from such molds, mechanism for actuating successively said pattern support devices at the first-mentioned station for releasing successively the patterns held thereby into the molds successively moved therebeneath, and mechanism at the second-mentioned station for actuating successively the tile support devices at such station for extracting from the molds successively moved therebeneath the patterns therein.

24. In apparatus of the class described the combination including, a first conveyor, a plurality of tile-forming molds mounted in spaced relation on said conveyor, a second conveyor mounted for movement with at least a portion thereof above said first conveyor, a plurality of pattern support devices mounted in spaced relation on said second conveyor, each of said devices being constructed and arranged detachably to carry a pattern member having a plurality of chambers therein, means for operating said conveyors to operate in timed relationship whereby at a first preselected station said support devices are successively moved above said molds which are successively moved therebeneath for the release of a pattern member into each mold, and at a second preselected station said support devices which have released their pattern members are successively moved above the pattern member containing molds for the extracting of each pattern member successively therefrom, mechanism for actuating successively said pattern support devices at the first station for releasing the pattern members carried thereby into the molds successively moved therebeneath, mechanism for actuating successively said pattern support devices at the second station for extracting from the molds successively moved therebeneath the pattern members therein, and means intermediate the stations for depositing tile ingredients within the chambers of the pattern members.

25. In combination, a conveyor; a plurality of spaced tile-forming molds carried thereby; means for operating said conveyor for moving said molds successively to a leveling station; a pair of leveling bars mounted for individual movement from a position adjacent one another to a spaced position relative to one another; a pair of substantially V-shaped plow face members secured to respective of said bars with the leading edges thereof directed away from one another; mechanism for lowering said bars and members, when the former are adjacent one another, into a pile of tile-forming material in a mold at the leveling station whereby said bars and members dip into the pile to a preselected depth; and mechanism for separating said bars whereby the tile-forming material is leveled centrally of the mold and also spread substantially sideways of the bars and V-shaped members whereby the material is levelled around the margin of the mold.

JOSÉ E. BALASQUIDE.

REFERENCES CITED

The following references are of record in the file of this patent:

UNITED STATES PATENTS

| Number | Name | Date |
| --- | --- | --- |
| 686,656 | Hoban | Nov. 12, 1901 |
| 687,688 | Klay | Nov. 26, 1901 |
| 805,299 | Kastenhuber | Nov. 21, 1905 |
| 1,366,226 | Welsh | Jan. 18, 1921 |
| 1,599,151 | Vought | Sept. 7, 1926 |
| 1,659,987 | Benson et al. | Feb. 21, 1928 |
| 1,733,706 | Widin | Oct. 29, 1929 |
| 1,875,644 | Nelson | Sept. 6, 1932 |
| 2,022,786 | Schwab | Dec. 3, 1935 |
| 2,191,143 | Hiatt et al. | Feb. 20, 1940 |
| 2,224,975 | McNamara | Dec. 17, 1940 |
| 2,259,728 | Bridges | Oct. 21, 1941 |
| 2,268,075 | Langer | Dec. 30, 1941 |
| 2,317,574 | Williams | Apr. 27, 1943 |